United States Patent [19]
Taylor et al.

[11] 3,887,708
[45] June 3, 1975

[54] ALPHA, ALPHA-DISUBSTITUTED-5-PYRIMIDINEMETHANES USED AS FUNGICIDES

[75] Inventors: Harold M. Taylor; James D. Davenport; Ronald E. Hackler, all of Indianapolis, Ind.

[73] Assignee: Eli Lilly and Company, Indianapolis, Ind.

[22] Filed: Dec. 20, 1972

[21] Appl. No.: 316,967

Related U.S. Application Data

[63] Continuation-in-part of Ser. No. 234,339, March 13, 1972, Pat. No. 3,818,009, which is a continuation-in-part of Ser. No. 888,949, Dec. 29, 1969, abandoned, which is a continuation-in-part of Ser. No. 829,844, May 7, 1969, abandoned, which is a continuation-in-part of Ser. No. 685,315, Nov. 24, 1967, abandoned, which is a continuation-in-part of Ser. No. 634,074, April 27, 1967, abandoned.

[52] U.S. Cl. .......................... 424/251; 71/90; 71/92
[51] Int. Cl. .......................... A01n 9/12; A01n 9/20
[58] Field of Search .................. 424/251; 260/251 R

[56] References Cited
UNITED STATES PATENTS

| | | | |
|---|---|---|---|
| 2,658,895 | 11/1953 | Ballard et al. | 260/251 |
| 2,727,895 | 12/1955 | Sperber et al. | 260/290 |
| 2,839,446 | 6/1958 | Margot et al. | 424/170 X |
| 3,461,125 | 8/1969 | Kollonitsch | 260/251 |

OTHER PUBLICATIONS

Schellenberger et al., C. A., 60, 14503g, (1964).

*Primary Examiner*—Albert T. Meyers
*Assistant Examiner*—Leonard Schenkman
*Attorney, Agent, or Firm*—Dwight E. Morrison; Everet F. Smith

[57] ABSTRACT

There are disclosed methods of controlling plant pathogenic fungi by applying fungicidally-effective amounts of $\alpha,\alpha$-disubstituted-5-pyrimidinemethanes and methanols, or the nonphytotoxic acid addition salts thereof, to the locus of the fungi.

12 Claims, No Drawings

ALPHA, ALPHA-DISUBSTITUTED-5-PYRIMIDINEMETHANES USED AS FUNGICIDES

CROSS REFERENCE

This application is a continuation-in-part of our co-pending application Ser. No. 234,339, filed Mar. 13, 1972 now U.S. Pat. No. 3,818,009, which is a continuation-in-part of our then copending application Ser. No. 888,949, filed Dec. 29, 1969, now abandoned, which was a continuation-in-part of our then copending application Ser. No. 829,844, filed May 7, 1969, now abandoned, which was a continuation-in-part of our then copending application Ser. No. 685,315, filed Nov. 24, 1967, now abandoned, which was a continuation-in-part of our then copending application Ser. No. 634,074, filed Apr. 27, 1967, and now abandoned.

BACKGROUND OF THE INVENTION

Ornamental plants, food crops, and turf are annually severely damaged by many types of fungi. Because of this damage, much effort has been expanded to find substances and methods for controlling such fungi.

In the prior art, Margot et al., U.S. Pat. No. 2,839,446 (June 17, 1958), teach novel pyrimidines which are said to possess fungicidal activity. The Margot et al. compounds are distinguished by having at least one trichloromethane sulphenylmercapto group preferably attached at the 2-position of the pyrimidine ring.

In addition, Ballard et al., U.S. Pat. No. 2,658,895 (Nov. 10, 1958), teach 2-alkylphenyl-3,4,5,6-tetrahydropyrimidines, which are alleged to have fungicidal and detergent properties and also are alleged to have use as asphalt additives.

Schellenberger et al., Angew. Chem. 76 (5), 226–7 (1964), teach the use of 2-methyl-5-hydroxymethyl-pyrimidine as an intermediate in the synthesis of a co-carboxylase inhibitor. This pyrimidine compound has the R and R' substituents equal to hydrogen in the generic formula shown below, and, in our tests, has been found to be inactive as a fungicide.

Bredereck et al., Chem. Ber., 93, 230–35 (1960), teach the preparation of 5-isopropylpyrimidine and 5-isoheptylpyrimidine, respectively. No utility is disclosed therefor.

Lewin et al., Arch. Biochem. and Biophysics, 101, 197–203 (1963), teach the use of 5-hydroxymethyl-pyrimidine as a substrate in studying the in vivo inhibition of thiamine synthesis.

SUMMARY

There has now been discovered a method for the control of plant pathogenic fungi which comprises applying to the locus of the fungi a fungicidally-effective amount of an α,α-disubstituted 5-pyrimidinemethane or methanol, or the nonphytotoxic acid addition salts thereof.

DESCRIPTION OF THE PREFERRED EMBODIMENT

The 5-substituted pyrimidines used in this invention are of the formula

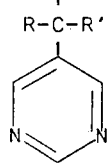

wherein
X is
   hydrogen,
   hydroxy,
   $C_1$–$C_4$ alkanoyloxy,
   $N(R'')_2$,
   $C_1$–$C_3$ alkyl,
   $C_1$–$C_3$ alkoxy,
   $C_1$–$C_3$ alkylthio,
   halo,
   cyano,
   anilino,
   hydroxylamino,
   imidazolylthio,
   furylthio, or
   thienylthio;
R is
   $C_1$–$C_{13}$ alkyl,
   $C_2$–$C_{12}$ alkenyl,

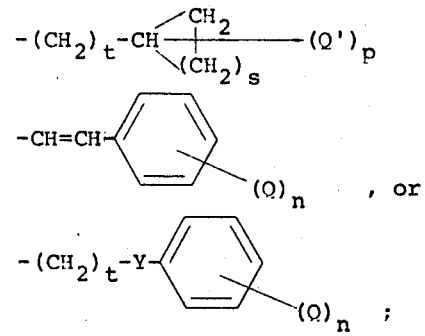

R' is
   $C_2$–$C_{13}$ alkyl,
   $C_2$–$C_{12}$ alkenyl,
   norbornen-2-yl,
   2-norbornyl,
   adamantyl,

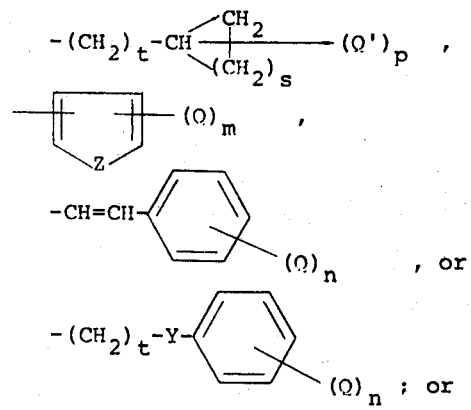

when X is hydrogen or hydroxy, R and R' taken together with the carbon atom to which they are attached form a ring of the formula

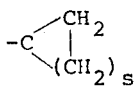

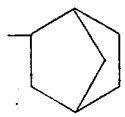

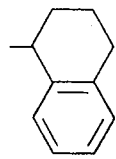

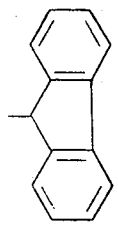, or

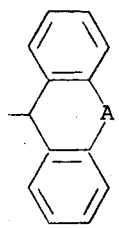;

Q is $C_1-C_4$ alkyl, $C_1-C_4$ alkoxy, $C_1-C_4$ alkylthio, halo, hydroxy, trifluoromethyl, $C_1-C_4$ alkylsulfonyl, nitro, or di($C_1-C_4$ alkyl)amino, or two Q's attached to adjacent carbon atoms of a benzene ring form a methylenedioxy group;

Q' is $C_1-C_4$ alkyl or methoxy;

Y is oxygen, sulfur, or a carbon-to-carbon bond;

Z is oxygen or sulfur;

A is oxygen, sulfur, $CH_2$, $CH_2-CH_2$, or $CH=CH$;

R'' is hydrogen, $C_1-C_4$ alkyl, or $C_1-C_4$ alkanoyl;

n is 0 to 5;

m is 0 to 2;

p is 0 to 3;

s is 1 to 6; and t is 0 to 5, and the nonphytotoxic acid addition salts thereof.

$C_1-C_4$ alkanoyloxy means formyl, acetyl, propionyl, or butyryl.

The various alkyl groups are saturated straight or branched-chain aliphatic hydrocarbon radicals such as, for example, methyl, ethyl, n-propyl, isopropyl, n-butyl, sec.-butyl, tert.-butyl, n-amyl, isoamyl, sec.-amyl, tertiary amyl and other isomeric amyl, n-hexyl, isohexyl, sec.-hexyl and other isomeric hexyl, n-heptyl, and other isomeric heptyls, n-octyl, isooctyl, and other isomeric octyls, n-nonyl, nonyl-2, nonyl-3, nonyl-4, 2-methyloctyl-2, 4-ethylheptyl-4, 3-methyl-4ethylhexyl-4, 3-methyl-3-ethylpentyl-3, 2-ethyl-hexyl-1, n-decyl, decyl-4, 3-ethyloctyl-3, undecyl, n-dodecyl, n-tridecyl, and the like.

Illustrative alkoxy groups are methoxy, ethoxy, propoxy, isopropoxy, n-butoxy, and isobutoxy.

Illustrative alkylthio groups are methylthio, ethylthio, n-propylthio, isopropylthio, and n-butylthio.

Halo includes bromo, chloro, fluoro and iodo.

Each of R and R' may be cycloalkyl groups containing from three to eight carbon atoms, optionally substituted with from one to three $C_1-C_4$ alkyl or methoxy groups. These groups can be attached directly to the α-carbon atom of the pyrimidinemethane or may be attached through from one to five methylene groups.

Each of R and R' may also be phenyl, phenoxy, or phenylthio or substituted phenyl, phenoxy, or phenylthio attached directly to the α-carbon or through one to five methylene groups. They may also be styryl or substituted styryl. In addition, one of them may be furyl, substituted furyl, thienyl or substituted thienyl.

Suitable $C_2-C_6$ alkenyl groups include vinyl, allyl, propenyl, 1-butenyl, 2-butenyl, 1-pentenyl, 2-pentenyl, 3-pentenyl, 1-hexenyl, 2-hexenyl, or 3-hexenyl.

It should be noted that only when X is hydrogen is there a hydrogen attached to the α-carbon atom of our 5-pyrimidinemethanes. There are never two hydrogens attached to this α-carbon atom. Thus, compounds wherein R and/or R' are hydrogen are outside the scope of the compounds useful in this invention. We have found such compounds, for example the 2-methyl-5-hydroxymethylpyrimidine of Schellenberger et al., to lack the activity of the compounds useful in this invention.

When X in the generic formula is hydrogen, preferred compounds contain no more than one alkyl group attached to the α-carbon. The other substituent on the α-carbon atom may usefully be phenyl, substituted phenyl, or cycloalkyl.

Suitable nonphytotoxic acid addition salts of the bases represented by the above formula can be prepared employing those acids of sufficient acidity to form acid addition salts with the weakly basic pyrimidine group or with an amine substituent attached thereto. These include, inter alia, hydrobromic, sulfuric, phosphoric, nitric, oxalic, methanesulfonic, hydrochloric, hydriodic, benzenesulfonic, P-toluenesulfonic, maleic, and the like.

Compounds regarded as coming within the scope of the above generic formula, and useful in the instant novel fungicidal method, include, but are not limited to, the following:

α,α-Dicycloheptyl-5-pyrimidinemethanol

α,α-Bis(2-chlorophenyl)-5-pyrimidinemethanol

α,α-Bis(3-chlorophenyl)-5-pyrimidinemethanol

α-(2-Chlorophenyl)-α-(4-methoxyphenyl)-5-pyrimidinemethanol

α-(3-Chlorophenyl)-α-(4-methoxyphenyl)-5-pyrimidinemethanol

α-Cyclopentyl-α-phenyl-5-pyrimidinemethanol

α-(2-Chlorophenyl)-α-(3-pyridyl)-5-pyrimidinemethanol

α-(3-Fluorophenyl)-α-(4-fluorophenyl)-5-pyrimidinemethanol

α,α-Bis(4-fluorophenyl)-5-pyrimidinemethanol
5-(2,4-Dichlorodiphenylmethyl)pyrimidine
α,α-Bis(n-pentyl)-5-pyrimidinemethanol
α-(2-Chlorophenyl)-α-(n-hexyl)-5-pyrimidinemethanol
α-(3-Fluorophenyl)-α-phenyl-5-pyrimidinemethanol
5-Diphenylmethylpyrimidine
α,α-Bis(n-nonyl)-5-pyrimidinemethanol
α-(4-Chlorophenyl)-α-(4-methoxyphenyl)-5-pyrimidinemethanol
α-(2,4-Dichlorophenyl)-α-phenyl-5-pyrimidinemethanol
5-Dicyclohexylmethylpyrimidine
α-Cyclohexyl-α-phenyl-5-pyrimidinemethanol
α-(3,4-Dichlorophenyl)-α-phenyl-5-pyrimidinemethanol
α-(2,4-Dimethylphenyl)-α-phenyl-5-pyrimidinemethanol
α-(2,4Difluorophenyl)-α-phenyl-5-pyrimidinemethanol
α-Cyclohexyl-α-(pentafluorophenyl)-5-pyrimidinemethanol
α-(n-Butyl)-α-ethyl-5-pyrimidinemethanol
α-Cyclopropyl-α-(4-methoxyphenyl)-5-pyrimidinemethanol
α-Isopropyl-α-phenyl-5-pyrimidinemethanol
α-(α,α,α-Trifluoro-m-tolyl)-α-phenyl-5-pyrimidinemethanol
α-(2,4Difluorophenyl)-α-phenyl-5-pyrimidinemethanol
α,α-Bis(n-Octyl)-5-pyrimidinemethanol
5-[α-(p-tolyl)benzyl]pyrimidine
α,α-Bis(3-fluorophenyl)-5-pyrimidinemethanol
α,α-Diphenyl-5-pyrimidineacetonitrile
5-(2-Chlorodiphenylmethyl)pyrimidine
5-(1-Phenyl-n-butyl)pyrimidine
5-(α-Phenylphenethyl)pyrimidine
5-(α-Aminodiphenylmethyl)pyrimidine
5-(α-Acetamidodiphenylmethyl)pyrimidine
5-[α(4-Bromophenylthio)-4-methoxybenzyl]pyrimidine
5-[α-n-Propylthio)diphenylmethyl]pyrimidine
5-[α-(2-Imidazolylthio)diphenylmethyl]pyrimidine
5-(α-Chlorodiphenylmethyl)pyrimidine,
5-(α-Cyclopropyl-α, p-dimethoxybenxyl)pyrimidine
and the like. The pyrimidinemethanols are regarded as the preferred compounds for use as fungicides.

The pyrimidines useful in the present invention have been found capable of controlling fungi which attack food crops, ornamental plants, and turf. The compounds have been found useful in combatting both airborne and soil-borne fungi which affect plants. Most unexpectedly and surprisingly, the pyrimidine compounds useful in this invention, unlike the closely related pyridine compounds, are systemically active as fungicidal agents. That is, the pyrimidine compounds are absorbed by the plant and transported throughout the plant via the vascular system of the plant. Further, the use of these pyrimidines causes certain plants to produce, in a manner as yet unknown or understood, fungicidal substances of an unknown structure, which substances can be extracted from the plant tissues by methods known to the art and shown to possess fungicidal activity in standard fungicidal tests.

The systemic antifungal action of these pyrimidines has been demonstrated by the following remarkable experiment: Seeds of cucumbers, for example, are soaked for a short period of time, about 10 minutes, in an ethanol-light isoparaffin oil solution of 5-substituted pyrimidine. The seeds are removed, dried, and planted, and produce plants free from powdery mildew and protected therefrom.

The compounds useful in the present invention have been shown by suitable in vitro and in vivo tests to control such fungi as *Erysiphe polygoni*, the causative organism of bean powdery mildew; *Colletotrichum lagenarium*, the causative organism of cucumber anthracnose; *Uromyces phaseoli*, the causative organism of bean rust; *Piricularis oryzae*, the causative organism of rice blast; and *Rhizoctonia solani*, the causative organism of damping off in cotton.

In addition, certain fungi which affect ornamental plants, including *Sphaerotheca pannosa* var. *rosae*, the causative organism of powdery mildew of rose, and *Erysiphe graminis*, the causative organism of powdery mildew of turf, are controlled by the novel pyrimidines of this invention.

The compounds useful in this invention are also active against certain turf pathogens which yearly inflict great damage to turf. These turf pathogens include *Helminthosporium sativum*, the causative organism of leaf spot; *Rhizoctonia solani*, the causative organism of brown patch; *Sclerotinia homoeocarpa*, the causative organism of dollar spot; *Fusarium roseum*, the causative organism of root rot; and *Pythium sp.*, the causative organism of pythium blight.

Many of the pyrimidine compounds useful as fungicides according to the instant invention also show growth regulator activity. The use of the pyrimidines as growth regulators is the subject of our copending U.S. application, Ser. No. 234,338, filed Mar. 13, 1972 now abandoned.

In operating according to the method of the present invention, the fungi to be controlled are contacted by the antifungal compounds according to the following general procedures. The antifungal composition is applied to infected or susceptible plant surfaces in any convenient fashion such as spraying, dusting, dipping, or drenching. A spray method is considered preferable, especially when large numbers of plants are involved, because of the rapidity and uniformity of treatment possible. In spraying, it is usually sufficient for the infected or susceptible surfaces to be throughly wet with the liquid dispersion employed. Good results have been obtained by employing spray compositions whether they be emulsions or aqueous dispersions of solid concentrates.

Where the fungi to be controlled are in the soil, the antifungal compounds can be applied to the soil directly or they can be diluted with various inert solid or liquid diluents, as described hereinbelow, and then applied to the fungus-infested area. In the case of the soil, the application is allowed to remain as a coating on the surface of the soil, or alternatively, is incorporated into the soil by disking, hoeing, or other methods well known to those skilled in the art.

The compounds used in the present invention are applied to plants in effective amounts, varying somewhat with the particular organism, with the severity of the infection, and with other factors such as the environment in which treatment is conducted. In general, it is found that an aqueous spray containing from about 2 to about 400 ppm. of active material is satisfactory when treatment is to be carried out in the greenhouse.

As is well understood in the art, a somewhat higher concentration of the active compound is desirable when treatment is to be carried out in the field. In that case, the preferred range is from about 15 to about 1000 ppm. of 5-substituted pyrimidine.

In the case of the turf pathogens, supra, control has been accomplished using an application rate of from about 0.05 to about 1.0 lb. per acre of the 5-substituted pyrimidine. Control of the other soil-borne fungi mentioned above has been accomplished using a broadcast application rate of about 5 to 40 lb. per acre of the 5-substituted pyrimidine.

For any such uses the compounds are formulated into compositions desirably containing, in addition to the 5-substituted pyrimidine, one or more of a plurality of additaments including water, polyhydroxy compounds, petroleum distillates, and other dispersion media, surface-active dispersing agents, emulsifiers, and finely-divided inert solids. The concentration of the 5-substituted pyrimidine compound in these compositions may vary depending on whether the composition is intended as an emulsifiable concentrate or a wettable powder designed to be subsequently diluted with additional inert carrier such as water to produce the ultimate treating composition or is intended for direct application as a dust to plants.

Thus, treating compositions are most conveniently formulated by preparing liquid or solid concentrates, which are subsequently diluted to the desired level for use. Emulsifiable liquid concentrates can be prepared by incorporating from about 1 to about 10 percent by weight of the active ingredient and an emulsifying agent in a suitable water-immiscible organic liquid. Such concentrates may be further diluted with water to form spray mixtures in the form of oil-in-water emulsions. Such spray compositions then comprise active toxicant, water-immiscible solvent, emulsifying agent, and water. Suitable emulsifying agents can be of the nonionic or ionic types, or blends thereof, and include condensation products of alkylene oxides with phenols and organic acids, polyoxyethylene derivatives of sorbitan esters, complex ether-alcohols, ionics of the aralkyl sulfonate type, and the like. Suitable water-immiscible organic liquids to be employed include aromatic hydrocarbons, aliphatic hydrocarbons, cycloaliphatic hydrocarbons, and mixtures thereof such as petroleum distillates.

Solid concentrate mixtures can be prepared by incorporating from about 10 to about 50 percent by weight of the substituted pyrimidine compound in a finely-divided inert solid carrier such as bentonite, fuller's earth, diatomaceous earth, hydrated silica, diatomaceous silica, expanded mica, talc, chalk, and the like. Such concentrates can be formulated, if desired, for direct use as dusting compositions, or can be diluted, if desired, with additional inert solid carriers to produce dusting powders containing around 0.05 to 1 percent by weight of the substituted pyrimidine. Alternatively, surfactants, that is, dispersing and/or wetting agents, can be incorporated along with the substituted pyrimidine in the solid carrier to form wettable powder concentrates ranging from 10 to 25 percent by weight concentration which subsequently can be dispersed in water or other hydroxylated carrier to form spray compositions. Suitable surfactants include condensed aryl sulfonic acids and sodium salts thereof, sodium lignosulfate, sulfonate-oxide condensate blends, alkyl aryl polyether alcohols, sulfonated nonionic blends, anionic wetting agents, and the like.

Further, the substituted pyrimidine toxicant can be incorporated in solutions, simple dispersions, aerosol formulations, and other media adaptable to be employed for treating vegetation or applying to the soil.

Where a fungicidal pyrimidine compound coming within the scope of the generic formula, supra, is applied in a seed coating, a coating formulation is prepared containing the pyrimidine compound and a suitable dye, together with other excipients such as glycerin, hydroxypropyl methyl cellulose, isopropyl alcohol, acetone, methylene chloride, and the like. The dye, for example, F.D. and C. Red No. 2, is merely added to identify the seeds as being coated and treated. The seeds are mixed in a miniature coating pan using a mixture of the coating formulation, a solution of the desired pyrimidine fungicide, and a solution of a dye.

The 5-substituted pyrimidinemethanols (X is OH in the generic formula, supra) are readily prepared in good yields by a synthesis exemplified as follows: A suitable ketone, for example, benzoylcyclohexane, is dissolved in a solvent composed of equal volumes of tetrahydrofuran and ethyl ether. The solution is cooled to $-120°C$., and while maintained at that temperature, a solution of 5-bromopyrimidine in equal volumes of tetrahydrofuran and ethyl ether is added thereto. While the mixture is maintained at about $-120°C$., a hexane solution of n-butyllithium is added. The reaction mixture is stirred overnight in the cold, the reaction product mixture washed successively with dilute aqueous ammonium chloride solution and water, and the organic layer separated and dried over a suitable drying agent. The dried organic layer is concentrated to dryness in vacuo and the solid residue extracted with ether to remove undesired by-products. The ether-insoluble material remaining is identified by elemental analysis as α-cyclohexyl-α-phenyl-5-pyrimidinemethanol.

An alternative method appears preferable in some instances and proceeds as follows: In a suitable reaction flask, dry ether is maintained in an atmosphere of dry nitrogen, cooled to about $-118°C$., and a solution of butyllithium in hexane added, followed by a solution of 5-bromopyrimidine in tetrahydrofuran. The reaction mixture is cooled to about $-120°C$. and a solution of a suitable ketone, for example, 4-fluorobenzophenone, in tetrahydrofuran is added at such a rate as to maintain the temperature of the reaction mixture at about $-120°C$. The reaction product mixture is stirred overnight and warmed gradually to room temperature. The mixture is neutralized with saturated aqueous ammonium chloride solution and extracted with ether. The combined ether extracts are dried, concentrated to dryness in vacuo and the residual material dissolved in benzene and chromatographed over a silica gell column, eluting with a mixture of ethyl acetate-benzene. The product obtained from the fraction eluted with 30:50 ethyl acetate-benzene was recrystallized from a solvent such as ether and identified as α-(4-fluorophenyl)-α-phenyl-5-pyrimidinemethanol.

When X is H in the generic formula, supra, some of the compounds can be prepared according to the procedure of Sperber et al., U.S. Pat. No. 2,727,895 (Dec. 20, 1955), whereby the 5-substituted pyrimidinemethanol (prepared as above) is heated in a mixture of glacial acetic acid and 47 percent aqueous hydriodic acid to reduce the hydroxyl group and yield the 5-substituted pyrimidinemethane.

In other compounds where X is H, the preparation is accomplished by the reaction of a suitably substituted malonic ester with urea or acetamidine, or the like. For example: A mixture of diethyl 4-methylbenzhydryl malonate and urea is allowed to react in an anhydrous alcohol such as methanol in the presence of sodium methylate to yield 2,4,6-trihydroxy-5-(4-methylbenzhydryl)pyrimidine. This trihydroxy compound is allowed to react with excess phosphorous oxychloride to yield 2,4,6-trichloro-5-(4-methylbenzhydryl)pyrimidine. The trichloropyrimidine is then hydrogenated in the presence of triethylamine and palladinized charcoal to yield 5-(4-methylbenzhydryl)pyrimidine.

Where X is cyano in the above generic formula, the compounds can be prepared in the following manner: A mixture of diphenylacetonitrile and 5-bromopyrimidine is allowed to react in the presence of potassium amide in a suitable solvent such as xylene to yield α, α-diphenyl-5-pyrimidineacetonitrile.

Those compounds where X is $C_1$-$C_3$ alkoxy are prepared by allowing an alkali-metal lower alkoxide such as sodium methoxide, potassium ethoxide, or sodium propoxide to react in alkanol solution with a 5-halo analogue of the desired product [e.g., 5-(α-chlorodiphenylmethyl)pyrimidine] to yield the desired product [e.g., 5-(α-$C_1$-$C_3$ alkoxydiphenylmethyl)-pyrimidine].

Those compounds where X is $C_1$-$C_3$ alkylthio are prepared in the following manner: A mixture of 5-(diphenylmethyl)pyrimidine and N-bromosuccinimide is dissolved in an inert, organic solvent, e.g., carbon tetrachloride, in the presence of benzoylperoxide and allowed to react to yield 5-(α-bromodiphenylmethyl)pyrimidine, which is separated and is in turn allowed to react with a suitable $C_1$-$C_3$ alkyl mercaptan, e.g., n-propyl mercaptan, in the presence of triethylamine, to yield the desired product, for example, 5-(α-n-propylthiodiphenylmethyl)pyrimidine.

In the case where X is $C_1$-$C_4$ alkanoyloxy, the compounds are prepared in the following manner: For example, a mixture of 5-(α-bromodiphenylmethyl)-pyrimidine, glacial acetic acid, and anhydrous sodium acetate is allowed to react to yield 5-(α-acetoxydiphenylmethyl)pyrimidine.

Where X is amino, the compounds are prepared by heating a mixture of the analogous halo-substituted pyrimidine, such as 5-(α-chlorodiphenylmethyl)pyrimidine, and excess liquid ammonia at an elevated temperature of about 100°C. in a sealed stainless steel reaction vessel for a time sufficient to complete the reaction. The product can be isolated as the free base 5-(α-aminodiphenylmethyl)pyrimidine, or in the form of a salt such as the hydrochloride, hydrobromide, or the like.

Correspondingly, 5-(α-hydroxylaminodiphenylmethyl)-pyrimidine and related compounds are readily prepared by allowing hydroxylamine to react with 5-(α-chlorodiphenylmethyl)pyrimidine or analogous 5-α-halo compounds.

Following the same general procedure, the 5-[α-(2-imidazolylthio)diphenylmethyl]pyrimidine is readily synthesized by allowing 2-mercaptoimidazole to react with 5-(α-chlorodiphenylmethyl)pyrimidine in the presence of a base such as sodium or potassium ethoxide in a suitable solvent such as absolute ethanol. The reaction product mixture is concentrated to dryness at reduced pressure and the solid residue slurried or extracted with a solvent such as hot benzene to dissolve the product, 5-[α-(2-imidazolylthio)diphenylmethyl]-pyrimidine, which then crystallizes from the benzene.

Where X is anilino, the compounds are readily prepared by heating a 5-halo analogue, such as 5-(α-chlorodiphenylmethyl)pyrimidine, with aniline in an inert solvent such as benzene on the steam bath for a time sufficient to complete the reaction. The aniline hydrochloride which precipitates is filtered off, the filtrate concentrated in vacuo to dryness, and the residue recrystallized from a suitable solvent such as ethyl ether to yield 5-(α,α-diphenyl-α-anilinomethyl)pyrimidine.

The following preparations described in detail the methods used in preparing the compounds useful in this invention.

PREPARATION 1

α-Cyclohexyl-α-phenyl-5-pyrimidinemethanol

To a solution of 0.1 mole of benzoylcyclohexane in 250 ml. of a mixture of equal volumes of tetrahydrofuran and ether and cooled to −120°C. was added a solution of 0.1 mole of 5-bromopyrimidine in the same mixed solvent. The mixture was stirred and maintained at about −120°C. in a cooling bath composed of liquid nitrogen and ethanol, and to the cooled solution was added 60 ml. of a 15 percent solution of n-butyllithium in n-hexane, and the reaction mixture was stirred overnight.

The reaction product mixture was washed successively with 10 percent aqueous ammonium chloride solution and water and dried over anhydrous potassium carbonate. The dried organic solution was evaporated to dryness to yield a solid weighing about 14 g. The solid was extracted with ether and the undissolved solid washed twice with ether. The etherinsoluble material was identified as α-cyclohexyl-α-phenyl-5-pyrimidinemethanol having a melting point of about 156°–157°C.

Following the general procedure of Preparation 1, with appropriate starting materials, the following compounds were prepared and isolated as free bases or acid addition salts thereof:

α,α-Bis(4-chlorophenyl)-5-pyrimidinemethanol. Melting point: Glass.

α-Phenyl-α-(4-chlorophenyl)-5-pyrimidinemethanol hydrochloride. Melting point: Glass.

α,α-Bis(cyclohexyl)-5-pyrimidinemethanol. Melting point: 142°–144°C.

α,α-Bis(n-hexyl)-5-pyrimidinemethanol. Melting point: Viscous liquid.

α-Methyl-α-phenyl-5-pyrimidinemethanol. Melting point: 70°C.

α,α-Bis(3-fluorophenyl)-5-pyrimidinemethanol. Melting point: Glass.

α-(2-Chlorophenyl)-α-(3-chlorophenyl)-5-pyrimidinemethanol. Melting point: Glass.

α-(2-Chlorophenyl)-α-(4-fluorophenyl)-5-pyrimidinemethanol. Melting point: 66°C.

α-(2-Chlorophenyl)-α-cyclohexyl-5-pyrimidinemethanol. Melting point: 65°C.

α,α-Diphenyl-5-pyrimidinemethanol. Melting point: 167°–170°C.

α-(2-Chlorophenyl)-α-phenyl-5-pyrimidinemethanol. Melting point: 154°–156°C.

α-(n-Pentyl)-α-phenyl-5-pyrimidinemethanol. Melting point: Liquid.

α-(2-Fluorophenyl)-α-phenyl-5-pyrimidinemethanol. Melting point: 139°–141°C.

α,α-Bis(3,4-dichlorophenyl)-5-pyrimidinemethanol hemietherate. Melting point: 88°–89°C.

α-(Phenyl)-α-(2-thienyl)-5-pyrimidinemethanol. Melting point: 140°–142°C.

α,α-Bis(isopropyl)-5-pyrimidinemethanol. Melting point: 115°–118°C.

α-(4-Ethoxyphenyl)-α-isopropyl-5-pyrimidinemethanol. Melting point: 89°C.

α-Cyclopropyl-α-(4-methoxyphenyl)-5-pyrimidinemethanol. Melting point: 111°C.

α-(4-Chlorophenyl)-α-isopropyl-5-pyrimidinemethanol. Melting point: 129°C.

α-(t-Butyl)-α-(4-methoxyphenyl)-5-pyrimidinemethanol. Melting point: 117°C.

α-(p-Cumenyl)-α-isopropyl-5-pyrimidinemethanol. Melting point: 98°C.

α-(3,4-Dichlorophenyl)-α-isopropyl-5-pyrimidinemethanol. Melting point: 127°C.

α-Cyclohexyl-α-cyclopropyl-5-pyrimidinemethanol. Melting point: 113°–114°C.

α-(3-Chlorophenyl)-α-isopropyl-5-pyrimidinemethanol. Melting point: 95°C.

α-Cyclopropyl-α-(p-cumenyl)-5-pyrimidinemethanol. Melting point: 104°C.

α-Cyclohexyl-α-isopropyl-5-pyrimidinemethanol. Melting point: Oil.

α,α-Bis(n-nonyl)-5-pyrimidinemethanol. Melting point: Oil.

α-(2,5-Dichlorophenyl)-α-cyclohexyl-5-pyrimidinemethanol. Melting point: 136°C.

α-(2-Chlorophenyl)-α-(4-methoxyphenyl)-5-pyrimidinemethanol. Melting point: Glass.

α-Cyclohexyl-α-(2-methoxyphenyl)-5-pyrimidinemethanol. Melting point: 114°–115°C.

α-Cyclohexyl-α-(2-fluorophenyl)-5-pyrimidinemethanol. Melting point: 140°–142°C.

α-Cyclohexyl-α-pentafluorophenyl-5-pyrimidinemethanol. Melting point: 149°–150°C.

α,α-Bis(2-chlorophenyl)-5-pyrimidinemethanol. Melting point: 132°–133°C.

α-(α,α,α-Trifluoro-m-tolyl)-α-isopropyl-5-pyrimidinemethanol. Melting point: 97°C.

α-(α,α,α-Trifluoro-p-tolyl)-α-isopropyl-5-pyrimidinemethanol. Melting point: 113°C.

α-Isopropyl-α-(4-propoxyphenyl)-5-pyrimidinemethanol. Melting point: 80°C.

α-Cyclopropyl-α-(p-tolyl)-5-pyrimidinemethanol. Melting point: 128°C.

α-(4-Bromophenyl)-α-cyclopropyl-5-pyrimidinemethanol. Melting point: 123°C.

α-(2-Fluorophenyl)-α-(4-fluorophenyl)-5-pyrimidinemethanol. Melting point: 130°C.

α-(t-Butyl)-α-(p-tolyl)-5-pyrimidinemethanol. Melting point: 155°C.

α-Cyclopropyl-α-(4-fluorophenyl)-5-pyrimidinemethanol. Melting point: 73°–74°C.

α-Isopropyl-α-(4-methoxyphenyl)-5-pyrimidinemethanol. Melting point: 148°C.

α-(4-Chlorophenyl)-α-cyclopropyl-5-pyrimidinemethanol. Melting point: 112°–113°C.

α-(4-Methoxyphenyl)-α-phenyl-5-pyrimidinemethanol. Melting point: 95°–97°C.

α-(2,4-Difluorophenyl)-α-phenyl-5-pyrimidinemethanol. Melting point: 120°–121°C.

α-(2,5-Dichlorophenyl)-α-phenyl-5-pyrimidinemethanol. Melting point: 134°–136°C.

α-Cyclobutyl-α-phenyl-5-pyrimidinemethanol. Melting point: 115°–117°C.

α-(3,4-Dichlorophenyl)-α-phenyl-5-pyrimidinemethanol. Melting point: Glass.

α-(2,4-Dichlorophenyl)-α-phenyl-5-pyrimidinemethanol. Melting point: 96°–97°C.

α-(4-Nitrophenyl)-α-phenyl-5-pyrimidinemethanol. Melting point: Glass.

α-(2-Fluorophenyl)-α-(3-fluorophenyl)-5-pyrimidinemethanol. Melting point: 104°–108°C.

α,α-Bis(p-tolyl)-5-pyrimidinemethanol. Melting point: Glass.

α-(2,4-Dimethylphenyl)-α-phenyl-5-pyrimidinemethanol. Melting point: Glass.

α,α-Bis(4-methylstyryl)-5-pyrimidinemethanol. Melting point: 159°–160°C.

α-(4-Chlorophenyl)-α-(4-phenoxy-n-butyl)-5-pyrimidinemethanol. Melting point: Viscous oil. Identified by N.M.R. spectrum and elemental analyses.

α-(5-Norbornen-2-yl)-α-phenyl-5-pyrimidinemethanol. Melting point: 137°C.

α,α-Bis[2-(4-methylcyclohexyl)ethyl]-5-pyrimidinemethanol. Melting point: Viscous oil. Identified by N.M.R. spectrum and elemental analyses.

α-Phenyl-α-(3-phenyl-n-propyl)-5-pyrimidinemethanol. Melting point: Viscous oil. Identified by N.M.R. and elemental analyses.

α-(4-Phenoxybutyl)-α-(2-norbornyl)-5-pyrimidinemethanol. Melting point: 132°C.

α-(4-Chlorophenyl)-α-(2-norbornyl)-5-pyrimidinemethanol. Melting point: 193°C.

α-(Pentenyl)-α-phenyl-5-pyrimidinemethanol. Melting point: Viscous oil. Identified by N.M.R. spectrum.

α-(3-Pentenyl)-α-phenyl-5-pyrimidinemethanol. Melting point: Glass. Identified by N.M.R. spectrum.

α-Phenyl-α-(4-trifluoromethylphenyl)-5-pyrimidinemethanol. Melting point: 125°–127°C.

α-Cyclobutyl-α-(4-methoxyphenyl)-5-pyrimidinemethanol. Melting point: 148°C.

PREPARATION 2

5-Bis(4-chlorophenyl)-methylpyrimidine

A mixture of 6 g. of α,α-bis(4-chlorophenyl)-5-pyrimidinemethanol, 200 ml. of glacial acetic acid, and 10 ml. of 47 percent hydriodic acid was refluxed for 40 minutes, poured into water, and the aqueous mixture extracted several times with ether. The combined ether layers were washed successively with water, 5 percent aqueous sodium bicarbonate solution, and water, dried over anhydrous magnesium sulfate, and evaporated in vacuo to dryness. The residue was extracted with petroleum ether and the extracts concentrated. The product was obtained as a thick reddish oil identified by infrared and nuclear magnetic resonance (N.M.R.) spectra as 5-bis(4-chlorophenyl)methylpyrimidine.

Following the same general procedure as in Preparation 2, with appropriate starting materials, the following compounds were prepared:

5-(2-Fluorodiphenylmethyl)pyrimidine. Melting point: Viscous oil.

5-Diphenylmethylpyrimidine. Melting point: 83°C.

5-(α-Isopropyl-4-methoxybenzyl)pyrimidine. Melting point: 67°-69°C.

5-[Bis(3,4-dichlorophenyl)methyl]pyrimidine. Melting point: Viscous oil.

PREPARATION 3

α,α-Diphenyl-5-pyrimidineacetonitrile

To 0.1 mole of potassium amide in liquid ammonia was added a solution of 0.1 mole of diphenylacetonitrile in 300 ml. of xylene, and the mixture was heated to refluxing for about 30 minutes to remove excess ammonia. To the xylene solution was added a solution of 0.1 mole of 5-bromopyrimidine in 100 ml. of xylene and the mixture stirred for about 20 minutes. To the mixture was then added 20 ml. of dimethylformamide and the mixture was refluxed for about one hour. The reaction product mixture was cooled in an ice bath and extracted with ether. The ether solution was evaporated to dryness, the residue dissolved in benzene and chromatographed on an alumina column, elution being carried out with ethyl acetate. The eluate was concentrated to yield α,α-diphenyl-5-pyrimidineacetonitrile as a solid having a melting point of about 98°-100°C., identified by N.M.R. spectrum and elemental analysis.

PREPARATION 4

2,4,6-Trichloro-5-(4-methylbenzhydryl)pyrimidine

To a solution of 22 g. (0.95 g.-atom) of sodium in 500 ml. absolute ethanol was added a solution of 33 g. (0.55 mole) of urea and 95 g. (0.28 mole) of diethyl 4-methylbenzhydryl malonate in 500 ml. of absolute ethanol, and the mixture was refluxed for about 2 hours. The reaction product mixture was cooled and diluted with about 1000 ml. of water and 500 ml. of ether. The layers were separated. The aqueous layer was washed with about 200 ml. of ether. The ether washings were combined with the original organic layer and washed with 200 ml. water. The washed aqueous layer and the water washings were combined and acidified with concentrated aqueous hydrochloric acid. An oily layer separated which solidified under vacuum. The crude solid was dissolved in dilute aqueous sodium hydroxide and the basic solution acidified with acetic acid. The solid which separated was recrystallized from acetic acid to yield a crystalline solid having a melting point of about 115°C. and identified by N.M.R. spectrum as 5-(4-methylbenzhydryl)barbituric acid. Weight: 45 g.

A mixture of 39 g. (0.13 mole) of 5-(4-methylbenzhydryl)barbituric acid (prepared above), 116 g. (0.76 mole) of phosphorus oxychloride, and 56 g. (0.38 mole) of N,N-diethylaniline was heated at reflux temperature for about 6 hours. The reaction product mixture was cooled, diluted with a mixture of crushed ice and water, and allowed to stand for about an hour. The mixture was extracted five times with 300 ml. of ether, the combined extracts were dried and the solvent was evaporated to dryness on the steam bath. The residue remaining was extracted with hot petroleum ether (b.p. = 60°-70°C.). The petroleum ether solution was cooled, and a crystalline product separated which had a melting point of about 112°-113°C. and weighed about 30 g. It was identified by N.M.R. spectrum and elemental analysis as 2,4,6-trichloro-5-(4-methylbenzhydryl)pyrimidine.

Following the general procedure of Preparation 4, with appropriate starting materials, other compounds were prepared and are listed as follows:

2,4,6-Trichloro-5-(benzhydryl)pyrimidine. Melting point: 105°-106°C.

2,4,6-Trichloro-5-(4-methoxybenzhydryl)pyrimidine. Melting point: 129°-131°C.

2,4,6-Trichloro-5-(2-chlorobenzhydryl)pyrimidine. Melting point: 162°-163°C.

2,4,6-Trichloro-5-(1-phenyl-n-heptyl)pyrimidine. Melting point: Oil.

2,4,6-Trichloro-5-(1-phenyl-n-tridecyl)pyrimidine. Melting point: Oil.

2,4,6-Trichloro-5-(1-phenyl-n-butyl)pyrimidine. Melting point: 72°C.

PREPARATION 5

5-(4-Methylbenzhydryl)pyrimidine

A mixture of 15 g. (0.041 mole) of 2,4,6-trichloro-5-(4-methylbenzhydryl)pyrimidine, 12.5 g. (0.124 mole) triethylamine, 100 ml. dry dioxane, and 1 g. of 5 percent palladinized charcoal was hydrogenated on a Paar shaker at an initial pressure of 15 p.s.i. for about 5 hours, during which time the theoretical amount of hydrogen was absorbed. When the hydrogenation was complete, the reaction product mixture was concentrated in vacuo to dryness. The residue was dissolved in benzene and chromatographed on an alumina column, eluting with ethyl acetate. A solid was obtained which was recrystallized from petroleum ether to yield crystalline material having a melting point of about 71°-72°C., and identified by N.M.R. spectrum and elemental analysis as 5-(4-methylbenzhydryl)pyrimidine. Weight: 8 g.

Following the general procedure of Preparation 5 with appropriate starting materials, other compounds were prepared and are listed as follows:

5-(Benzhydryl)pyrimidine. Melting point: 83°C.

5-(4-Methoxybenzhydryl)pyrimidine. Melting point: Oil.

5-(2-Chlorobenzhydryl)pyrimidine. Melting point: 107°-108°C.

5-(1-Phenyl-n-heptyl)pyrimidine. Melting point: Oil.

5-(1-Phenyl-n-butyl)pyrimidine. Melting point: Oil.

5-(1-Phenyl-n-tridecyl)pyrimidine. Melting point: Oil.

PREPARATION 6

5-(α-Chlorodiphenylmethyl)pyrimidine

To a refluxing solution of 40 g. of α,α-diphenyl-5-pyrimidinemethanol in 200 ml. of xylene was added anhydrous hydrogen chloride gas via a bubbler tube, and the by-product water was collected in a Dean-Stark trap. The reaction product mixture was concentrated in vacuo to dryness. The dry residue was washed with ethyl ether to remove starting material, and the ethyl ether-insoluble residue was dissolved in hot petroleum ether. The petroleum ether was evaporated to dryness and the residue recrystallized from ether to yield solid product weighing 6 g. and having a melting point of about 92°–94°C. The product was identified as 5-(α-chlorodiphenylmethyl)pyrimidine by elemental analysis and N.M.R. spectrum.

PREPARATION 7

5-(α,α-Diphenyl-α-anilinomethyl)pyrimidine

A mixture of 5 g. of 5-(α-chlorodiphenylmethyl)-pyrimidine, 10 ml. of aniline, and 40 ml. of benzene was warmed for about an hour on the steam bath. The reaction product mixture was cooled and filtered to remove aniline hydrochloride, and the filtrate concentrated to dryness. The solid residue was recrystallized from ethyl ether to yield a yellow crystalline product weighing 2 g. and having a melting point of about 140°–144°C. The product was identified as 5-(α,α-diphenyl-α-anilinomethyl)pyrimidine by N.M.R. spectrum.

PREPARATION 8

5-(α,α-Diphenyl-α-hydroxylamino)pyrimidine

A mixture of 5 g. of 5-(α-chlorodiphenylmethyl)-pyrimidine and excess hydroxylamine in ethanolic sodium ethoxide was refluxed for about 1 hour. The reaction product mixture was evaporated to dryness and the residue extracted with benzene. The benzene solution was filtered, concentrated to dryness, and the residue extracted with ether. The ether extract was concentrated to dryness, yielding a crude product having a melting point of about 110°–125°C., identified by N.M.R. and infrared spectra as 5-(α,α-diphenyl-α-hydroxylamino)pyrimidine.

PREPARATION 9

5-(α-Ethoxydiphenylmethyl)pyrimidine

A mixture of 10 g. of 5-(α-chlorodiphenylmethyl)-pyrimidine and a saturated solution of liquid ammonia in absolute alcohol was prepared and an exothermic reaction took place. When the exothermic reaction had subsided, the reaction product mixture was filtered and the filtrate evaporated to dryness. The solid residue was extracted with chloroform and the chloroform solution allowed to stand overnight at ambient room temperature. The crude crystals which separated were dissolved in ethyl acetate and chromatographed over alumina using a mixture of hexane and ethyl acetate as eluting solvent. A solid having a melting point of about 95°–97°C. was obtained from the eluate and identified by N.M.R. spectrum and elemental analysis as 5-(α-ethoxydiphenylmethyl)pyrimidine.

PREPARATION 10

5-(α-Aminodiphenylmethyl)pyrimidine

A mixture of 12 g. of 5-(α-chlorodiphenylmethyl)-pyrimidine and an excess of liquid ammonia was heated at a temperature of about 100°C. for about 2 hours in a closed stainless steel high-pressure reaction vessel. The reaction product was removed from the reaction vessel, the excess ammonia allowed to evaporate, and the residue extracted with benzene. The benzene solution was concentrated to yield a crystalline product having a melting point of about 135°–137°C. The product was identified as 5-(α-aminodiphenylmethyl)-pyrimidine by N.M.R. spectrum and elemental analysis.

PREPARATION 11

5-[α-(2-Imidazolylthio)-diphenylmethyl]pyrimidine

The potassium salt of 2-mercaptoimidazole was prepared by adding 10 g. of 2-mercaptoimidazole to an ethanol solution of potassium ethoxide prepared from 1 g. of potassium and 200 ml. of absolute ethanol. To the above mixture was added 5 g. of 5-(α-chlorodiphenylmethyl)pyrimidine and the reaction mixture heated to refluxing for about 2 hours. The reaction product mixture was concentrated in vacuo to dryness and the residue extracted with hot benzene. The benzene extract was cooled, and a solid product crystallized therefrom, weighing 3 g. and having a melting point of about 165°–167°C. It was identified as 5-[α-(2-imidazolylthio)diphenylmethyl]-pyrimidine by elemental analysis and N.M.R. spectrum.

PREPARATION 12

5-(α-Phenylphenethyl)pyrimidine

To sodamide in liquid ammonia prepared by the addition of 1.2 g. (0.05 g.-atom) of sodium to 500 ml. of liquid ammonia, was added 8.3 g. (0.05 mole) of 5-benzylpyrimidine, and the resulting red-brown mixture was stirred for about 10 to 15 minutes. A solution of 6.3 g. (0.05 mole) of benzyl chloride in 15 ml. anhydrous ether was added and the reaction mixture stirred about 1 hour. To the reaction product mixture was added 200 ml. of ether and the mixture was evaporated to near dryness on the steam bath. The residue was slurried again with 200 ml. of ether and evaporated to dryness. The dry residue was dissolved in a mixture of about 500 ml. of ether and 200 ml. of water and the ether layer separated and dried over anhydrous magnesium sulfate. The drying agent was filtered off, and from the ether solution a solid precipitated. The solid, on standing, became an oil, which was dissolved in benzene and chromatographed on an alumina column, elution being carried out with a mixture of ethyl acetate and benzene. From the eluate a solid product was obtained which, upon recrystallization from petroleum ether, had a melting point of about 80°–82°C. The crystalline product weighed about 5 g. and was identified as 5-(α-phenylphenethyl)pyrimidine by elemental analysis and N.M.R. spectrum.

PREPARATION 13

5-(α-Acetaminodiphenylmethyl)pyrimidine

A mixture of 4.5 g. of 5-(α-aminodiphenylmethyl)-pyrimidine and 50 ml. of acetic anhydride was heated until a homogeneous solution was obtained. The reaction product mixture was allowed to stand at ambient room temperature overnight and then was concentrated in vacuo to remove the solvent, leaving a dry residue. The residue was recrystallized from hot benzene to yield about 2.5 g. of crystalline product having a melting point of about 187°–189°C. The product was identified as 5-(α-acetaminodiphenylmethyl)pyrimidine by elemental analysis and N.M.R. spectrum.

PREPARATION 14

α-(4-Fluorophenyl)-α-phenyl-5-pyrimidinemethanol

To 300 ml. of anhydrous ether maintained in an atmosphere of dry nitrogen gas in a suitably equipped 3-neck roundbottom reaction flask cooled to −118°C. by an alcohol-liquid nitrogen cooling bath, was added 170 ml. (0.3 mole) of a 15 percent solution of butyllithium in hexane. Cooling and stirring in the dry nitrogen atmosphere were continued while a solution of 0.3 mole of 5-bromopyrimidine in 150 ml. of dry tetrahydrofuran was added and the whole stirred for about 2 hours. The temperature of the reaction mixture was lowered to −125°C. and a solution of 0.3 mole of 4-fluorobenzophenone in 150 ml. of dry tetrahydrofuran was added slowly while maintaining the temperature of the mixture at about −120°C. The reaction product mixture was stirred overnight and warmed to ambient room temperature. The reaction product mixture was neutralized by the addition of a saturated aqueous solution of ammonium chloride. The neutralized mixture was extracted with ether and the combined ether extracts dried over anhydrous potassium carbonate, filtered, and concentrated to dryness in vacuo and the residue dissolved in benzene. The benzene solution was chromatographed over 1500 g. of silica gel, elution being accomplished with an ethyl acetate-benzene mixture, using a gradient elution technique. The fraction obtained using a solvent containing 30:50 ethyl acetate-benzene was concentrated to dryness at reduced pressure, yielding 52 g. of product having a melting point of about 112°–114°C. after recrystallization from ether. The product was identified by elemental analysis and N.M.R. spectrum as α-(4-fluorophenyl)-α-phenyl-5-pyrimidinemethanol.

PREPARATION 15

5-(α-n-Propylthiodiphenylmethyl)pyrimidine

The halogen-substituted pyrimidine, 5-(α-bromodiphenylmethyl)pyrimidine used in this synthesis was prepared as follows:

To a solution of 25 g. (0.1 mole) of 5-(diphenylmethyl)pyrimidine in 250 ml. of carbon tetrachloride was added 18.7 g. (1.05 equivalents) of N-bromosuccinimide and 0.05 g. of benzoyl peroxide. The reaction mixture was refluxed for about 1.5 hours, cooled and concentrated to dryness in vacuo to remove the solvent. The solid residue which remained was extracted several times with methylene dichloride to obtain the 5-(α-bromodiphenylmethyl)pyrimidine, and the combined extracts divided into two equal portions.

The methylene dichloride solvent was removed in vacuo from one portion and there was added to the residue a solution of 7.6 g. (0.1 mole) of n-propylmercaptan in 150 ml. of triethylamine. A precipitate formed almost immediately after the mixing. The reaction mixture was stirred overnight at ambient room temperature, and then refluxed for about 1 hour and the solvent removed at reduced pressure. The residue was treated with a mixture of ether and water, the ether layer separated and dried, after which the ether solvent was evaporated to leave a solid residue. The residue was extracted several times with hot petroleum ether (b.p. 60°–71°C.). The petroleum ether was evaporated in vacuo to yield a viscous oil, identified by nuclear magnetic resonance spectrum as 5-(α-n-propylthiodiphenylmethyl)pyrimidine.

PREPARATION 16

5-(α-Acetoxydiphenylmethyl)pyrimidine

The second methylene dichloride solution of 5-(α-bromodiphenylmethyl)pyrimidine was concentrated in vacuo to remove the solvent, and to the residue was added 100 ml. of glacial acetic acid and 8.2 g. (0.1 mole) of anhydrous sodium acetate. The reaction mixture was stirred overnight at ambient room temperature and then heated to refluxing. After about 2 hours, the solvent was removed in vacuo and the solid residue extracted three times with 100 ml. of hot benzene, filtering each time. The benzene extracts were combined and evaporated to dryness in vacuo. The residue was extracted with several portions of hot petroleum ether (b.p. 60°–71°C.), the extracts combined, concentrated, and cooled. The solid material which crystallized out was identified by its nuclear magnetic resonance spectrum as 5-(α-acetoxydiphenylmethyl)-pyrimidine.

The use of the substituted 5-pyrimidine compounds and acid addition salts thereof, represented by the above formula, can be illustrated by the following procedures.

EXAMPLE 1

The evaluation of the effectiveness of compounds exemplified by the above formula against *Erysiphe polygoni*, the causative organism of bean powdery mildew, was accomplished in the greenhouse in the following manner.

Fungicidal compositions were prepared by dissolving 40 mg. of the compound to be tested in 1 ml. of a solution of cyclohexanone containing 55 mg. of sulfonate nonionic blend and diluting to a volume of 100 ml. with water. This composition then contained 400 ppm. of fungicide. To prepare a composition containing 1000 ppm., 100 mg. of the compound to be tested was dissolved in 1 ml. of the cyclohexanonesulfonate nonionic blend solution and then diluted to a volume of 100 ml. with water.

Three bean seeds (Kentucky Wonder variety) were planted in 4-inch clay pots and allowed to germinate. The plants were thinned to two plants per pot. Ten days after the day of planting the seeds, the test chemicals, compounded as described above, were sprayed on all leaf surfaces of the bean plants and allowed to dry. The plants were then placed in the greenhouse and Kentucky Wonder beans heavily infested with powdery mildew were placed above them for about 5 days, after which they were removed. At the end of five additional days (20 days after planting) the plants were observed for development of the disease. The appearance of the treated plants was compared with that of untreated plants and ratings of the control of the fungus were recorded. The control rating scale used was as follows:

1 — no control
2 — slight control
3 — moderate control
4 — good control
5 — complete control, no fungus Chart 1, which follows, sets forth the results of the testing of several substituted 5-pyrimidinemethanols against *Erisyphe polygoni*. In the Chart, Column 1 gives the name of the compound; Column 2, the rate in terms of ppm. at which the compound was applied to the test plants; and Column 3, the Control Rating of the compound.

CHART 1

| Compound | Application Rate, ppm. | Control Rating |
| --- | --- | --- |
| α,α-Bis(cycloheptyl)- | 400 | 5 |

CHART 1-Continued

| Compound | Application Rate, ppm. | Control Rating |
|---|---|---|
| α,α-Bis(2-chlorophenyl)-5-pyrimidinemethanol | 400 | 5 |
| | 80 | 5 |
| | 16 | 4 |
| | 3.2 | 4 |
| α,α-Bis(3-chlorophenyl)-5-pyrimidinemethanol | 400 | 5 |
| | 80 | 4 |
| | 16 | 4 |
| | 3.2 | 3 |
| α-Cyclopropyl-α-(4-fluorophenyl)-5-pyrimidinemethanol | 400 | 5 |
| | 80 | 3 |
| | 16 | 1 |
| α,α-Bis(2-thienyl)-5-pyrimidinemethanol | 400 | 5 |
| | 80 | 3 |
| | 16 | 3 |
| 5-(α-Acetamidodiphenylmethyl)pyrimidine | 400 | 5 |
| | 80 | 3.5 |
| | 16 | 2 |
| α,α-Diphenyl-5-pyrimidineacetonitrile | 400 | 5 |
| | 80 | 4.5 |
| | 16 | 4 |
| | 3.2 | 3 |
| α,α-Bis(3-fluorophenyl)-5-pyrimidinemethanol | 400 | 5 |
| | 80 | 4.5 |
| | 16 | 2.5 |
| | 3.2 | 2 |
| α-(n-Pentyl)-α-phenyl-5-pyrimidinemethanol | 400 | 4 |
| | 80 | 3.5 |
| | 16 | 2.5 |
| | 3.2 | 2 |
| α-Cyclobutyl-α-(4-fluorophenyl)-5-pyrimidinemethanol | 400 | 5 |
| | 80 | 3 |
| | 16 | 1 |
| α,α-Bis(3-chlorophenyl)-5-pyrimidinemethanol picrate sesquihydrate | 400 | 5 |
| | 80 | 5 |
| | 16 | 5 |
| | 3.2 | 4 |
| α-(2-Chlorophenyl)-α-(4-methoxyphenyl-5-pyrimidinemethanol | 400 | 5 |
| | 80 | 5 |
| | 16 | 5 |
| | 3.2 | 4 |
| α-(3-Chlorophenyl)-α-(4-methoxyphenyl)-5-pyrimidinemethanol | 400 | 5 |
| | 80 | 4 |
| | 16 | 3 |
| | 3.2 | 4 |
| α-Cyclopentyl-α-phenyl-5-pyrimidinemethanol | 400 | 5 |
| | 80 | 5 |
| | 16 | 1 |
| α-(2,5-Dichlorophenyl)-α-phenyl-5-pyrimidinemethanol | 400 | 5 |
| | 80 | 4 |
| | 16 | 4 |
| | 3.2 | 4 |
| α,α-Bis(cyclopentyl)-5-pyrimidinemethanol | 400 | 5 |
| | 80 | 3 |
| | 16 | 1 |
| α-(2-Chlorophenyl)-α-(3-pyridyl)-5-pyrimidinemethanol | 400 | 5 |
| | 80 | 5 |
| | 16 | 3 |
| | 3.2 | 2 |
| α-(3-Fluorophenyl)-α-(4-fluorophenyl)-5-pyrimidinemethanol | 400 | 5 |
| | 80 | 5 |
| | 16 | 5 |
| | 3.2 | 3 |
| α-(2-Chlorophenyl)-α-(4-fluorophenyl)-5-pyrimidinemethanol | 400 | 5 |
| | 80 | 5 |
| | 16 | 5 |
| α,α-Bis(4-fluorophenyl)-5-pyrimidinemethanol | 400 | 5 |
| | 80 | 5 |
| | 16 | 5 |
| 5-(2,4-Dichlorodiphenylmethyl)pyrimidine | 400 | 5 |
| | 80 | 5 |
| | 16 | 5 |
| α,α-Bis(n-pentyl)-5-pyrimidinemethanol | 400 | 5 |
| | 80 | 5 |
| | 16 | 2 |
| α-(3,5-Dichlorophenyl)-α-phenyl-5-pyrimidinemethanol | 400 | 4 |
| α-(2-Chlorophenyl)-α-(n-hexyl)-5-pyrimidinemethanol | 400 | 5 |
| | 80 | 5 |
| | 16 | 3 |
| | 3.2 | 2 |
| α-(2-Chlorophenyl)-α-cyclohexyl-5-pyrimidinemethanol | 400 | 5 |
| | 80 | 5 |
| | 16 | 4 |
| α-(2-Fluorophenyl)-α-(4-fluorophenyl)-5-pyrimidinemethanol | 400 | 5 |
| α-(4-Chlorophenyl)-α-cyclohexyl-5-pyrimidinemethanol | 400 | 5 |
| α-(3-Fluorophenyl)-α-phenyl-5-pyrimidinemethanol | 400 | 5 |
| | 80 | 5 |
| | 16 | 5 |
| 5-Diphenylmethylpyrimidine | 400 | 5 |
| | 80 | 3 |
| | 16 | 2 |
| α-(4-Chlorophenyl)-α-(4-methoxyphenyl)-5-pyrimidinemethanol | 400 | 5 |
| α,α-Bis(n-hexyl)-5-pyrimidinemethanol | 400 | 4 |
| α-(3-Chlorophenyl)-α-phenyl-5-pyrimidinemethanol | 400 | 3 |
| | 80 | 3 |
| | 16 | 2 |
| | 3.2 | 1 |
| α-(2-Chlorophenyl)-α-(3-chlorophenyl)-5-pyrimidinemethanol | 400 | 5 |
| | 80 | 4 |
| | 16 | 2 |
| α-(2,4-Dichlorophenyl)-α-phenyl-5-pyrimidinemethanol | 400 | 5 |
| | 80 | 4 |
| | 16 | 3 |
| α,α-Bis(n-octyl)-5-pyrimidinemethanol | 400 | 5 |
| α,α-Bis(4-chlorophenyl)-5-pyrimidinemethanol | 400 | 5 |
| | 80 | 4 |
| | 16 | 1 |
| 5-(α-Ethoxydiphenylmethyl)pyrimidine | 400 | 5 |
| | 80 | 4 |
| | 16 | 2.5 |
| 5-(α-Aminodiphenylmethyl)pyrimidine | 400 | 5 |
| | 80 | 3.5 |
| | 16 | 3 |
| 5-Dicyclohexylmethylpyrimidine | 400 | 3 |
| 5-Bis(4-chlorophenyl)methylpyrimidine | 400 | 5 |
| α-Cyclohexyl-α-phenyl-5-pyrimidinemethanol | 400 | 5 |
| | 80 | 5 |
| | 16 | 3 |
| α-(3,4-Dichlorophenyl)-α-phenyl-5-pyrimidinemethanol | 400 | 4 |
| | 80 | 4 |
| | 16 | 4 |
| 5-(3,4-Dichlorodiphenylmethyl)pyrimidine | 400 | 5 |
| | 80 | 4.5 |
| | 16 | 4 |
| | 3.2 | 3.5 |
| α-(2-Chlorophenyl)-α-phenyl-5-pyrimidinemethanol | 400 | 4 |
| | 80 | 5 |
| | 16 | 3.5 |
| | 3.2 | 2.5 |
| α-(n-Pentyl)-α-phenyl-5-pyrimidinemethanol | 400 | 4.5 |
| | 80 | 3.5 |
| | 16 | 2 |
| α-(2-Fluorophenyl)-α-(3-fluorophenyl)-5-pyrimidinemethanol | 400 | 5 |
| | 80 | 4.5 |
| | 16 | 5 |
| | 3.2 | 3 |
| 5-(4-Methoxydiphenylmethyl)pyrimidine | 400 | 4 |
| | 80 | 2 |
| α-(2-Chlorophenyl)-α-(4-chlorophenyl)-5-pyrimidinemethanol | 400 | 5 |
| | 80 | 4.5 |
| | 16 | 4 |
| | 3.2 | 4 |
| α-(2,4-Dichlorophenyl)-α-phenyl-5-pyrimidinemethanol picrate | 400 | 5 |
| | 80 | 5 |
| | 16 | 5 |
| | 3.2 | 4 |
| α-(α,α,α-Trifluoro-m-tolyl)-α-phenyl-5-pyrimidinemethanol | 400 | 4 |
| | 80 | 4 |
| | 16 | 3 |
| 5-(α-Methylbenzyl)pyrimidine | 400 | 3 |
| α,α-Di(p-tolyl)-5-pyrimidinemethanol | 400 | 3 |
| α-(2,4-Dimethylphenyl)-α-phenyl-5-pyrimidinemethanol | 400 | 5 |
| | 80 | 4 |
| | 16 | 3 |
| | 3.2 | 2 |
| 5-(1-Phenyl-n-butyl)pyrimidine | 400 | 3 |
| α,α-Bis(n-nonyl)-5-pyrimidinemethanol | 400 | 5 |
| | 80 | 3 |
| | 16 | 2 |
| α-(2,4-Difluorophenyl)-α-phenyl-5-pyrimidinemethanol | 400 | 5 |
| | 80 | 5 |
| | 16 | 5 |
| | 3.2 | 4.5 |
| α-(4-Chlorophenyl)-α-phenyl-5-pyrimidinemethanol hydrochloride | 400 | 5 |
| | 80 | 5 |
| | 16 | 5 |
| | 3.2 | 3 |
| α,α-Diphenyl-5-pyrimidinemethanol | 400 | 5 |
| | 80 | 4.5 |
| | 16 | 4.5 |

CHART 1-Continued

| Compound | Application Rate, ppm. | Control Rating |
|---|---|---|
| α-Cyclohexyl-α-(2-fluoro-phenyl)-5-pyrimidinemethanol | 3.2<br>400<br>80<br>16 | 2<br>5<br>4.5<br>3 |
| α-(4-Methoxyphenyl)-α-phenyl-5-pyrimidinemethanol | 3.2<br>400<br>80<br>16 | 1<br>5<br>4<br>3 |
| α-(2-Fluorophenyl)-α-phenyl-5-pyrimidinemethanol | 3.2<br>400<br>80<br>16 | 1<br>5<br>4<br>3 |
| α-(4-Fluorophenyl)-α-phenyl-5-pyrimidinemethanol | 3.2<br>400<br>80<br>16 | 1<br>5<br>5<br>4 |
| α-Cyclohexyl-α-(2-methoxy-phenyl-5-pyrimidinemethanol | 3.2<br>400<br>80<br>16 | 2<br>5<br>5<br>4 |
| α-(2,5-Dichlorophenyl)-α-cyclohexyl-5-pyrimidinemethanol | 3.2<br>400<br>80<br>16 | 3<br>5<br>5<br>5 |
| α-Cyclohexyl-α-(pentafluoro-phenyl)-5-pyrimidinemethanol | 3.2<br>400<br>80<br>16 | 4.5<br>5<br>5<br>4.5 |
| α-Phenyl-α-(3,4-xylyl)-5-pyrimidinemethanol | 3.2<br>400<br>80<br>16 | 5<br>4<br>3<br>1 |
| α-(1-Pentenyl)-α-phenyl-5-pyrimidinemethanol | 400<br>80<br>16 | 5<br>3<br>1 |
| α-Cyclohexyl-α-(3-cyclohexyl-n-propyl)-5-pyrimidinemethanol | 400<br>80<br>16 | 5<br>4<br>2 |
| α-(2-Chloro-4-methoxyphenyl)-α-phenyl-5-pyrimidinemethanol | 400<br>80<br>16 | 5<br>4<br>2 |
| α-Cyclohexyl-α-cyclohexyl-methyl-5-pyrimidinemethanol | 400<br>80<br>16 | 5<br>5<br>3 |
| α-Isopropyl-α-(4-methoxy-phenyl)-5-pyrimidinemethanol | 3.2<br>400<br>80<br>16 | 3<br>5<br>4<br>3 |
| α-Cyclohexyl-α-(2,5-dimethylcyclohexyl)-5-pyrimidinemethanol | 3.2<br>400 | 3<br>5 |
| α-Cyclopropyl-α-(2-thienyl)-5-pyrimidinemethanol | 400 | 3 |
| 5-[α-(n-Propylthio)diphenylmethyl]pyrimidine | 400 | 4 |
| 5-[α-(2-Imidazolylthio)-diphenylmethyl]pyrimidine | 400<br>80<br>16 | 4.5<br>2<br>2 |
| α-Neopentyl-α-phenyl-5-pyrimidinemethanol | 400<br>80<br>16 | 5<br>3<br>3 |
| α-Cyclohexylmethyl-α-methyl-5-pyrimidinemethanol | 400<br>80<br>16 | 4.5<br>4<br>2.5 |
| α,α-Bis(cyclohexyl)-5-pyrimidinemethanol | 400<br>80<br>16 | 5<br>4.5<br>2.5 |
| 5-(α-Chlorodiphenyl-methyl)pyrimidine | 400<br>80<br>16<br>3.2 | 5<br>4.5<br>3<br>2.5 |
| α-(4-Nitrophenyl)-α-phenyl-5-pyrimidinemethanol | 400<br>80<br>16<br>3.2 | 5<br>4<br>4<br>3 |
| α-Cyclopropyl-α-(3,4-xylyl)-5-pyrimidinemethanol | 400<br>80<br>16 | 5<br>4<br>3 |
| α,α-Bis(cyclopentylmethyl)-5-pyrimidinemethanol | 400<br>80<br>16 | 5<br>3<br>1 |
| α-(3-Chlorophenyl)-α-(2-fluorophenyl)-5-pyrimidinemethanol | 400<br>80<br>16<br>3.2 | 5<br>5<br>4.5<br>4 |
| α-Phenyl-α-(2-thienyl)-5-pyrimidinemethanol | 400<br>80<br>16 | 4.5<br>4<br>3 |
| 5-(α-Aminodiphenylmethyl)- | 400 | 5 |

CHART 1-Continued

| Compound | Application Rate, ppm. | Control Rating |
|---|---|---|
| pyrimidine hydrochloride | 80<br>16<br>3.2 | 3<br>3<br>3 |
| 5-(α,α-Diphenyl-α-anilino-methyl)pyrimidine | 400<br>80<br>16 | 4.5<br>3<br>3 |
| 5-(α-Phenylphenethyl)pyrimidine | 400<br>80<br>16 | 4.5<br>3<br>2 |

EXAMPLE 2

The following experimental procedure was used to demonstrate the efficacy of certain compositions of this invention to inhibit the growth of *Uromyces phaseoli* var. *typica*, the causative organism of bean rust.

Bean plants were grown from seeds planted in sand contained in 4-inch plastic pots, three bean seeds of the Pinto variety being planted in each pot.

On the 10th day after planting the seeds, the bean plants were infected by spraying the foliage with a spore suspension of *Uromyces phaseoli* var. *typica*.

The compound to be tested was weighed out and dissolved in a mixture of aqueous 1 percent cyclohexanone as a solvent and aqueous 0.1 percent polyoxyethylene sorbitan monolaurate as a surfactant to give a concentration of test compound of 400 ppm. A 5-ml. portion of this solution was placed in a test tube and diluted to a volume of 50 ml. with aqueous 0.085 percent sodium chloride solution to give a concentration of test compound of 40 ppm., the concentration at which the present test was carried out. The sodium chloride solution was used to provide an isotonic medium for the plants. A bean plant was removed from the sand in a pot, the roots washed with water and the plant placed in a test tube containing a solution of the compound being tested. The plants in the test tubes were placed in the greenhouse for a period of 10 days. During this time, the roots of each plant were aerated for about 10 to 15 minutes 4 times daily, air being introduced into the bottom of the test tube via a capillary tube. At the end of 10 days, the plants were examined for evidence of the development of bean rust and compared with two plants which had been inoculated with *Uromyces phaseoli* var. *typica* and placed in test tubes containing all ingredients except the test chemicals. The Control Rating scale used was the same as for Example 1.

CHART 2

| Compound | Application Rate, ppm. | Control Rating |
|---|---|---|
| α,α-Bis(n-pentyl)-5-pyrimidinemethanol | 40<br>20<br>10 | 5<br>5<br>5 |
| α-(n-Butyl)-α-ethyl-5-pyrimidinemethanol | 40 | 4 |
| α,α-Bis(n-nonyl)-5-pyrimidinemethanol | 40 | 3 |
| α-(2-Chlorophenyl)-α-(n-hexyl)-5-pyrimidinemethanol | 40 | 5 |
| α,α-Bis(3-chlorophenyl)-pyrimidinemethanol | 40 | 5 |
| α-Cyclopentyl-α-phenyl-5-pyrimidinemethanol | 40<br>20<br>10<br>5 | 5<br>5<br>5<br>5 |
| α-(2-Chlorophenyl)-α-(3-pyridyl)-5-pyrimidinemethanol | 40<br>20 | 5<br>4 |

CHART 2-Continued

| Compound | Application Rate, ppm. | Control Rating |
|---|---|---|
| | 10 | 2 |
| | 5 | 1 |
| α,α-Diphenyl-5-pyrimidinemethanol | 40 | 5 |
| | 20 | 5 |
| | 10 | 4+ |
| α-(3-Fluorophenyl)-α-(4-fluoro-phenyl)-5-pyrimidinemethanol | 40 | 5 |
| | 20 | 5 |
| | 10 | 5 |
| | 5 | 1 |
| α-(2-Chlorophenyl)-α-(4-fluoro-phenyl)-5-pyrimidinemethanol | 40 | 5 |
| | 20 | 5 |
| | 10 | 5 |
| | 5 | 5 |
| α,α-Bis(4-fluorophenyl)-5-pyrimidinemethanol | 40 | 5 |
| | 20 | 5 |
| | 10 | 5 |
| | 5 | 4.5 |
| α-(2-Chlorophenyl)-α-cyclo-hexyl-5-pyrimidinemethanol | 40 | 5 |
| | 20 | 5 |
| | 10 | 5 |
| | 5 | 5 |
| α-(4-Chlorophenyl)-α-cyclo-hexyl-5-pyrimidinemethanol | 40 | 3 |
| α-(2-Chlorophenyl)-α-(4-methoxy-phenyl)-5-pyrimidinemethanol | 40 | 5 |
| | 20 | 5 |
| | 10 | 5 |
| | 5 | 5 |
| α-(3-Fluorophenyl)-α-phenyl-5-pyrimidinemethanol | 40 | 5 |
| | 20 | 5 |
| | 10 | 5 |
| α,α-Bis(cycloheptyl)-5-pyrimidinemethanol | 40 | 3 |
| α-Cyclopropyl-α-(4-methoxy-phenyl)-5-pyrimidinemethanol | 40 | 5 |
| | 20 | 3 |
| | 10 | 1 |
| α-Isopropyl-α-phenyl-5-pyrimidinemethanol | 40 | 3 |
| α,α-Bis(cyclopentyl)-5-pyrimidinemethanol | 40 | 5 |
| | 20 | 5 |
| | 10 | 5 |
| | 5 | 5 |
| α-(2-Chlorophenyl)-α-(3-chloro-phenyl)-5-pyrimidinemethanol | 40 | 5 |
| | 20 | 5 |
| | 10 | 4.5 |
| | 5 | 4 |
| α-(2-Chlorophenyl)-α-(4-chloro-phenyl)-5-pyrimidinemethanol | 40 | 5 |
| | 20 | 5 |
| | 10 | 4 |
| | 5 | 5 |
| α-(α,α,α-Trifluoro-m-tolyl)-α-phenyl-5-pyrimidinemethanol | 40 | 3.5 |
| | 20 | 2 |
| | 10 | 1 |
| α-(2,4-Difluorophenyl)-α-phenyl-5-pyrimidinemethanol | 40 | 5 |
| | 20 | 5 |
| | 10 | 5 |
| | 5 | 5 |
| α-(4-Chlorophenyl)-α-phenyl-5-pyrimidinemethanol hydrochloride | 40 | 5 |
| | 20 | 5 |
| | 10 | 3 |
| | 5 | 3 |
| α-Cyclohexyl-α-phenyl-5-pyrimidinemethanol | 40 | 5 |
| | 20 | 5 |
| | 10 | 5 |
| | 5 | 5 |
| α-(2,4-Dichlorophenyl)-α-phenyl-5-pyrimidinemethanol | 40 | 5 |
| | 20 | 5 |
| | 10 | 4 |
| | 5 | 4.5 |
| α,α-Bis(2-chlorophenyl)-5-pyrimidinemethanol | 40 | 5 |
| | 20 | 5 |
| | 10 | 4 |
| | 5 | 3.5 |
| α-(2-Fluorophenyl)-α-phenyl-5-pyrimidinemethanol | 40 | 5 |
| | 20 | 5 |
| | 10 | 4.5 |
| | 5 | 5 |
| α-(4-Fluorophenyl)-α-phenyl-5-pyrimidinemethanol | 40 | 4.5 |
| | 20 | 5 |
| | 10 | 5 |
| | 5 | 5 |
| α-Cyclohexyl-α-(2-methoxy-phenyl)-5-pyrimidinemethanol | 40 | 5 |
| | 20 | 5 |
| | 10 | 5 |
| | 5 | 3.5 |
| 5-[α-(2-Imidazolylthio)-diphenylmethyl]pyrimidine | 40 | 5 |
| | 20 | 3 |
| | 10 | 3 |
| 5-(α-Chlorodiphenyl-methyl)pyrimidine | 40 | 5 |
| | 20 | 5 |
| | 10 | 3.5 |
| | 5 | 3 |
| α-Phenyl-α-(2-thienyl)-5-pyrimidinemethanol | 40 | 5 |
| | 20 | 5 |
| | 10 | 2 |
| | 5 | 2 |
| 5-(α-Aminodiphenylmethyl)-pyrimidine hydrochloride | 40 | 3 |
| α-(4-Chlorophenyl)-α-isopropyl-5-pyrimidinemethanol | 40 | 5 |
| | 20 | 5 |
| | 10 | 4.5 |
| | 5 | 3 |
| α-Cyclohexyl-α-(4-methoxy-phenyl)-5-pyrimidinemethanol | 40 | 5 |
| | 20 | 4 |
| | 10 | 3 |
| α-Cyclobutyl-α-phenyl-5-pyrimidinemethanol | 40 | 5 |
| | 20 | 5 |
| | 10 | 4.5 |
| | 5 | 3 |
| α,α-Bis(3-fluorophenyl)-5-pyrimidinemethanol | 40 | 5 |
| | 20 | 4 |
| | 10 | 2.5 |
| | 5 | 1 |
| α-(n-Pentyl)-α-phenyl-5-pyrimidinemethanol | 40 | 5 |
| | 20 | 5 |
| | 10 | 5 |
| | 5 | 5 |
| α-(2,4-Dichlorophenyl)-α-phenyl-5-pyrimidinemethanol picrate | 40 | 5 |
| | 20 | 5 |
| | 10 | 3 |
| | 5 | 2.5 |
| α-(2-Fluorophenyl)-α-(4-fluoro-phenyl)-5-pyrimidinemethanol | 40 | 5 |
| | 20 | 5 |
| | 10 | 4.5 |
| | 5 | 5 |
| α-(4-Methoxyphenyl)-α-phenyl-5-pyrimidinemethanol | 40 | 5 |
| | 20 | 4.5 |
| | 10 | 3.5 |
| α-Cyclopentyl-α-(3,5-dimethoxy-phenyl)-5-pyrimidinemethanol | 40 | 5 |
| | 20 | 5 |
| | 10 | 3.5 |
| | 5 | 1 |
| α-Cyclobutyl-α-(4-methoxy-phenyl)-5-pyrimidinemethanol | 40 | 5 |
| | 20 | 5 |
| | 10 | 5 |
| | 5 | 5 |
| α-Cyclopentyl-α-cyclopentyl- | 40 | 5 |
| α-Cyclohexyl-α-cyclopropyl-5-pyrimidinemethanol | 40 | 5 |
| | 20 | 4 |
| | 10 | 4 |
| | 5 | 3 |
| α-(3-Pentenyl)-α-phenyl-5-pyrimidinemethanol | 40 | 5 |
| | 20 | 5 |
| | 10 | 3.5 |
| | 5 | 1 |
| α-Cyclopropyl-α-(p-tolyl)-5-pyrimidinemethanol | 40 | 5 |
| | 20 | 4 |
| | 10 | 3 |
| α-Cyclobutyl-α-(4-fluoro-phenyl)-5-pyrimidinemethanol | 40 | 5 |
| | 20 | 5 |
| | 10 | 5 |
| | 5 | 3 |
| α-(3,4-Dimethoxyphenyl)-α-isopropyl-5-pyrimidinemethanol | 40 | 5 |
| | 20 | 5 |
| | 10 | 4 |
| α-(4-Chlorophenyl)-α-(2-fluoro-phenyl)-5-pyrimidinemethanol | 40 | 5 |
| | 20 | 4.5 |
| | 10 | 3.5 |
| | 5 | 2 |
| α-Cyclopentyl-α-isopropyl-5-pyrimidinemethanol | 40 | 5 |
| | 20 | 4.5 |
| | 10 | 3 |
| α-(2-Chlorophenyl)-α-(3-fluoro-phenyl)-5-pyrimidinemethanol | 40 | 5 |
| | 20 | 5 |
| | 10 | 5 |
| α-(1-Ethylpropyl)-α-(4-methoxy-phenyl)-5-pyrimidinemethanol | 40 | 5 |
| | 20 | 5 |
| | 10 | 3 |
| | 5 | 1 |

EXAMPLE 3

The pyrimidines were tested against *Colletotrichum laganarium*, the causative organism of cucumber anthracnose. Formulation of the fungicides was done as described in Example 1. Four cucumber seeds (Green Prolific variety) were planted in sterilized soil in 4-inch plastic pots, and after germination the plants were thinned to two per pot. On the 15th day after planting, the test chemical was sprayed on all leaf surfaces and allowed to dry. Two plants were sprayed with only the diluted solvent-emulsifier solution to serve as checks. A water suspension of conidia of *Colletotrichum laganarium* was applied to the foliage by means of a sprayer, and all plants were then placed in the moist chamber at 75°F. for 40 hours. On the 17th day, the plants were returned to the greenhouse, and allowed to remain for 9 days, at which time the plants were observed for development of disease symptoms, compared with the check plants, and rated for control. The same values for the rating system were used as in Example 1. Results are shown in Chart 3.

CHART 3

| Compound | Application Rate, ppm. | Control Rating |
| --- | --- | --- |
| α-(n-Butyl)-α-ethyl-5-pyrimidinemethanol | 400 | 3 |
| α,α-Bis(n-hexyl)-5-pyrimidinemethanol | 400 | 3 |
| α-(4-Chlorophenyl)-α-(4-methoxyphenyl)-5-pyrimidinemethanol | 400 | 3 |
| α,α-Bis(3-chlorophenyl)-5-pyrimidinemethanol | 400 | 4 |
| | 80 | 2 |
| | 16 | 1 |
| α,α-Bis(cycloheptyl)-5-pyrimidinemethanol | 400 | 4 |
| α-(3-Fluorophenyl)-α-(4-fluorophenyl)-5-pyrimidinemethanol | 400 | 4.5 |
| | 80 | 3.5 |
| | 16 | 1.5 |
| α-(2-Chlorophenyl)-α-(4-fluorophenyl)-5-pyrimidinemethanol | 400 | 5 |
| | 80 | 4.5 |
| | 16 | 4 |
| | 3.2 | 2 |
| α,α-Bis(4-fluorophenyl)-5-pyrimidinemethanol | 400 | 4.5 |
| | 80 | 3 |
| | 16 | 2 |
| | 3.2 | 3 |
| α-(2-Chlorophenyl)-α-cyclohexyl-5-pyrimidinemethanol | 400 | 4.5 |
| | 80 | 3 |
| | 16 | 1 |
| α-(2-Chlorophenyl)-α-(3-chlorophenyl)-5-pyrimidinemethanol | 400 | 5 |
| | 80 | 4 |
| | 16 | 3 |
| α-(2,4-Dichlorophenyl)-α-phenyl-5-pyrimidinemethanol | 400 | 4 |
| | 80 | 3 |
| | 16 | 2.5 |
| α,α-Bis(4-chlorophenyl)-5-pyrimidinemethanol | 2000 | 4 |
| | 400 | 4.5 |
| | 80 | 3 |
| 5-(α-Ethoxydiphenylmethyl)pyrimidine | 400 | 3 |
| 5-(α-Aminodiphenylmethyl)pyrimidine | 400 | 4 |
| α-(2-Fluorophenyl)-α-(3-fluorophenyl)-5-pyrimidinemethanol | 400 | 5 |
| | 80 | 3 |
| | 16 | 2 |
| α-(2-Chlorophenyl)-α-(4-chlorophenyl)-5-pyrimidinemethanol | 400 | 5 |
| | 80 | 3 |
| | 15 | 1 |
| α-(2,4-Dimethylphenyl)-α-phenyl-5-pyrimidinemethanol | 400 | 4 |
| α-(2,4-Dichlorophenyl)-α-phenyl-5-pyrimidinemethanol | 400 | 4 |
| | 80 | 3 |
| | 16 | 1.5 |
| α,α-Bis(3-chlorophenyl)-5-pyrimidinemethanol picrate sesquihydrate | 400 | 3 |
| α-(2,4-Difluorophenyl)-α-phenyl-5-pyrimidinemethanol | 400 | 5 |
| | 80 | 3 |
| | 16 | 2 |
| α-(4-Fluorophenyl)-α-phenyl-5-pyrimidinemethanol | 400 | 4.5 |
| | 80 | 2.5 |
| | 16 | 1.5 |
| α-Cyclohexyl-α-(2-methoxyphenyl)-5-pyrimidinemethanol | 400 | 4 |
| 5-Diphenylmethylpyrimidine | 400 | 4 |
| | 80 | 3 |
| | 16 | 1 |

CHART 3-Continued

| Compound | Application Rate, ppm. | Control Rating |
| --- | --- | --- |
| α-(2-Chlorophenyl)-α-(4-methoxyphenyl)-5-pyrimidinemethanol | 400 | 4 |
| | 80 | 1 |
| 5-(α,α-Diphenyl-α-anilinomethyl)pyrimidine | 400 | 3 |
| 5-[α-(t-Butyl)-α,4-dimethoxybenzyl]pyrimidine | 400 | 4 |
| | 80 | 2 |
| | 16 | 2 |

EXAMPLE 4

The evaluation of the effectiveness of compounds exemplified by the above formula against *Rhizoctonia solani*, strain T., the causative organism of damping-off of cucumber seedlings was accomplished in the greenhouse in the following manner.

One hundred twenty-five grams of silty sand infected with *Rhizoctonia solani*, strain T., was placed in a No. 60 canfreeze jar. An indentation was made in the surface of the silty sand, into which indentation was placed 3 grams of granulated diatomaceous earth (30–60 mesh). The granulated diatomaceous earth was then impregnated with four ml. of a solution containing an amount of test compound equivalent to a broadcast application rate of 40 pounds per acre. The canfreeze jar was shaken by hand for a few seconds before being placed on a roller for about 3 minutes to thoroughly incorporate the test compound throughout the contents of the jar. A portion of the treated, infected soil was then transferred to a 2.5-inch plastic pot and planted to 12 cucumber seeds, variety Green Prolific. The seeds in the pot were covered with the remainder of the treated, infected soil from the jar to a depth of about one-half inch. The planted pots were then placed in a temperature-humidity controlled growth cubicle in the greenhouse and watered as needed.

1-(Butylcarbamoyl)-2-benzimidazole carbamic acid, methyl ester, was used as the reference fungicide at application rates ranging from 2.5 to 10 lb./acre, based on 100 percent chemical activity. One infected, but not treated, and three uninoculated soil controls were also run in each test. After 14 days the pots were examined and the results recorded.

In Chart 4, Column 1 gives the names of the test compounds; Column 2, the Application Rate in terms of pounds per acre; and Column 3, the Control Rating, the rating scale being the same as that employed in previous examples.

CHART 4

| Compound | Application Rate, lb./A. | Control Rating |
| --- | --- | --- |
| 5-Dicyclohexylmethylpyrimidine | 20 | 5 |
| | 10 | 3 |
| | 5 | 1 |
| α-(2,4-Dichlorophenyl)-α-phenyl-5-pyrimidinemethanol | 40 | 4 |
| | 20 | 4 |
| | 10 | 4 |
| | 5 | 4 |
| α,α-Bis(2-chlorophenyl)-5-pyrimidinemethanol | 40 | 3 |
| α,α-Bis(n-pentyl)-5-pyrimidinemethanol | 40 | 5 |
| | 20 | 3 |
| | 10 | 5 |
| α-(2-Chlorophenyl)-α-(3-pyridyl)-5-pyrimidinemethanol | 40 | 3 |
| | 20 | 3 |
| | 10 | 3 |
| | 5 | 2 |
| α,α-Bis(n-octyl)-5- | 40 | 3 |

CHART 4-Continued

| Compound | Application Rate, lb./A. | Control Rating |
| --- | --- | --- |
| pyrimidinemethanol | | |
| α-(2-Chlorophenyl)-α-(3-chlorophenyl)-5-pyrimidinemethanol | 40 | 3.5 |
| | 20 | 3 |
| | 10 | 3 |
| α-Cyclohexyl-α-(2-methoxyphenyl)-5-pyrimidinemethanol | 40 | 5 |
| α-(2-Fluorophenyl)-α-phenyl-5-pyrimidinemethanol | 40 | 3 |
| α,α-Diphenyl-5-pyrimidinemethanol | 40 | 1 |
| | 20 | 3 |
| | 10 | 3 |
| | 5 | 3 |
| α-(2,4-Dichlorophenyl)-α-phenyl-5-pyrimidinemethanol picrate | 40 | 5 |
| | 20 | 4 |
| | 10 | 5 |
| | 5 | 2 |
| α-(2,4-Dimethylphenyl)-α-phenyl-5-pyrimidinemethanol | 40 | 3 |
| 5-(1-Phenyl-n-butyl)pyrimidine | 40 | 5 |
| | 20 | 5 |
| | 10 | 5 |
| α-(2-Chlorophenyl)-α-phenyl-5-pyrimidinemethanol | 40 | 5 |
| | 20 | 3 |
| | 10 | 4 |
| 5-(3,4-Dichlorodiphenylmethyl)pyrimidine | 40 | 4 |
| | 20 | 5 |
| | 10 | 5 |
| α-Cyclohexyl-α-phenyl-5-pyrimidinemethanol | 40 | 5 |
| | 20 | 5 |
| | 10 | 5 |
| α-(2,4-Difluorophenyl)-α-phenyl-5-pyrimidinemethanol | 40 | 5 |
| | 20 | 5 |
| | 10 | 5 |
| | 5 | 5 |
| | 2.5 | 5 |
| α-(2-Chlorophenyl)-α-(4-fluorophenyl)-5-pyrimidinemethanol | 40 | 5 |

EXAMPLE 5

The evaluation of the effectiveness of compounds exemplified by the above formula against *Piricularia oryzae*, race N-1, the causative organism of rice blast was accomplished in the greenhouse in the following manner.

Four-inch plastic pots containing a 50:50 mixture of sand and loam were thickly seeded with rice seed, variety NATO, and placed in the greenhouse. Fourteen days from the day of planting, the test chemicals, compounded as described in Example 1, were sprayed on all leaf surfaces of the rice plants and allowed to dry. The diluted solvent-emulsifier solution was sprayed on the leaf surfaces of the rice plants in one pot, which served as a check. On the same day the foliage of each plant was inoculated with a water suspension of conidia, applied with a DeVilbiss sprayer, following which all plants were placed in a cart moist chamber at a temperature of 67°F. for a period of 48 hours, and then returned to the greenhouse. At the end of 6 additional days, or 22 days after planting, the plants were examined for symptoms of the disease and the results recorded. The results are given in Chart 5 using the same rating system in Example 1.

CHART 5

| Compound | Application Rate, ppm. | Control Rating |
| --- | --- | --- |
| α,α-Bis(cycloheptyl)-5-pyrimidinemethanol | 400 | 3.5 |
| | 80 | 3 |
| | 16 | 1 |
| α,α-Bis(3-chlorophenyl)-5-pyrimidinemethanol | 400 | 3— |
| | 80 | 3— |
| α-(4-Chlorophenyl)-α-(4-methoxyphenyl)-5-pyrimidinemethanol | 400 | 3— |

CHART 5-Continued

| Compound | Application Rate, ppm. | Control Rating |
| --- | --- | --- |
| α-(2-Chlorophenyl)-α-(4-fluorophenyl)-5-pyrimidinemethanol | 400 | 3— |
| α-(2-Chlorophenyl)-α-cyclohexyl-5-pyrimidinemethanol | 400 | 4.5 |
| | 80 | 2.5 |
| | 16 | 2.5 |
| 5-[α-(p-Tolyl)benzyl]pyrimidine | 400 | 3 |
| α,α-Bis(3-fluorophenyl)-5-pyrimidinemethanol | 400 | 3 |
| | 80 | 1 |
| α-(2-Chlorophenyl)-α-(4-chlorophenyl)-5-pyrimidinemethanol | 400 | 3 |
| | 80 | 2 |
| | 16 | 1 |

EXAMPLE 6

The pyrimidine compounds were tested against the following fungi pathogenic to turf: *Rhizoctonia solani*, the causative organism of brown patch; *Sclerotinia homoeocarpa*, the causative organism of dollar spot; and *Helminthosporium sativum*, the causative organism of leaf spot.

Turf used in the testing was obtained from field plots of established grasses. The turf was cut, using a cup cutter 4.5 inches in diameter, and the turf was placed immediately in pint-sized plastic containers. All the turf was stored under Gro-lux lights in the greenhouse until needed for use. The type of grass used was the Seaside variety of bent grass.

Fungicidal compositions were prepared as described in Example 1. For those compounds not soluble in the solvent mixture of cyclohexanone and sulfonate nonionic blend, a mixture containing 50 percent acetone and 50 percent ethanol was used.

Three replicates were run on each compound tested along with three replicates for solvent check, three replicates for untreated check, and three replicates for uninoculated check. A commercially-available fungicide was also run as a check at its recommended rate of 5 pounds per acre. A total of 45 pots of turf per disease were run simultaneously. The pots of turf were numbered from 1 to 45, in order, as placed on a cart moist chamber, and each compound assigned three numbers at random. The pots of turf were inoculated by shaking a measured amount of vermiculite-grown inoculum over the grass. The inoculated pots of turf, with numbers corresponding to a given compound, were removed from the cart, sprayed with the test composition, and replaced on the cart moist chamber in their original location. The pots of turf were then incubated under the proper temperature and humidity conditions, as follows:

*Rhizoctonia solani* was incubated at a temperature of about 80°–85°F. at 90–100 percent relative humidity for about 48–72 hours.

*Sclerotinia homoeocarpa* was incubated at a temperature of about 70°–80°F. at 90–100 percent relative humidity for about 24–48 hours.

*Helminthosporium sativum* was incubated at a temperature of about 70°–75°F. at 100 percent relative humidity for about 4–5 days.

At the end of the respective incubation periods, the pots of turf were examined for symptoms of the diseases and the results recorded. The results, using the same rating system as in Example 1, are given in Chart 6. In the chart, at Columns 3, 4, and 5 respectively, R=*Rhizoctonia solani*; S=*Sclerotinia homoeocarpa*; and H=*Helminthosporium sativum*.

*inaequalis*, the causative organism of apple scab.

CHART 6

| Compound | Application Rate, lb./A | Diseases and Control Ratings | | |
|---|---|---|---|---|
| | | R | S | H |
| α,α-Bis(4-chlorophenyl)-5-pyrimidinemethanol | 1.0 | | 2.0 | |
| | 0.5 | | 1.0 | |
| 5-(α-Ethoxydiphenyl-methyl)pyrimidine | 1.0 | | 1.6 | |
| | 0.5 | | 0.6 | |
| 5-[α-(p-Tolyl)-benzyl]pyrimidine | 1.0 | | 2.6 | |
| | 0.5 | | 2.0 | |
| α-(4-Chlorophenyl)-α-phenyl-5-pyrimidinemethanol HCl | 1.0 | | 3.3 | |
| | 0.5 | | 2.3 | |
| α,α-Diphenyl-5-pyrimidine-acetonitrile | 1.0 | | 3.3 | |
| | 0.5 | | 2.6 | |
| α,α-Bis(cyclohexyl)-5-pyrimidinemethane | 1.0 | 2.6 | 3.3 | |
| | 0.5 | 2.3 | 3.0 | |
| α,α-Bis(n-hexyl)-5-pyrimidinemethanol | 1.0 | 1.6 | 2.6 | |
| | 0.5 | 1.3 | 2.6 | |
| α-Cyclobutyl-α-phenyl-5-pyrimidinemethanol | 1.0 | 1.6 | 2.6 | |
| | 0.5 | 1.6 | 2.3 | |
| α-Cyclohexyl-α-phenyl-5-pyrimidinemethanol | 1.0 | | | |
| | 0.5 | 4.0 | 3.0 | |
| | 0.25 | 3.3 | 2.6 | |
| | 0.125 | 2.6 | 2.0 | |
| α-(2-Chlorophenyl)-α-(3-chlorophenyl)-5-pyrimidinemethanol | 1.0 | 3.6 | 4.0 | |
| | 0.5 | 3.6 | 3.0 | |
| | 0.25 | 2.3 | 3.0 | |
| | 0.125 | 1.6 | 2.0 | |
| | 0.1 | 2.3 | 2.6 | |
| | 0.05 | 1.6 | 0.6 | |
| α-(2-Chlorophenyl)-α-phenyl-5-pyrimidinemethanol | 1.0 | 4.0 | 4.0 | 2.6 |
| | 0.5 | 2.6 | 3.0 | 2.6 |
| | 0.25 | 3.0 | 2.0 | 1.6 |
| | 0.125 | 3.6 | 3.3 | 1.3 |
| | 0.06 | 3.6 | 2.6 | — |
| α-(n-Pentyl)-α-phenyl-5-pyrimidinemethanol | 1.0 | 1.6 | 2.6 | 1.0 |
| α-(2-Chlorophenyl)-α-(4-chlorophenyl)-5-pyrimidinemethanol | 1.0 | 3.6 | 4.0 | — |
| | 0.5 | 3.6 | 3.6 | — |
| | 0.25 | 3.6 | 3.0 | 2.3 |
| | 0.125 | 3.3 | 2.6 | 2.3 |
| | 0.06 | 2.3 | 0.3 | 1.0 |
| α-(2,4-Dichlorophenyl)-α-phenyl-5-pyrimidinemethanol | 1.0 | 3.6 | 3.3 | — |
| | 0.5 | 4.0 | 3.6 | — |
| | 0.1 | 2.6 | 2.0 | 3.6 |
| | 0.05 | 1.6 | 1.6 | 2.6 |
| | 0.01 | 0.6 | 0.3 | 1.0 |
| α-(2,4-Dichlorophenyl)-α-phenyl-5-pyrimidinemethanol picrate | 2.0 | 3.3 | 3.3 | 2.6 |
| | 1.0 | 3.0 | 3.3 | 2.6 |
| | 0.5 | 2.0 | 2.6 | 2.3 |
| α-(α,α,α-Trifluoro-m-tolyl)-α-phenyl-5-pyrimidinemethanol | 2.0 | | 2.3 | |
| | 1.0 | | 1.6 | |
| | 0.5 | | 1.3 | |
| α-(2,4-Dimethylphenyl)-α-phenyl-5-pyrimidinemethanol | 2.0 | | 3.6 | 3.0 |
| | 1.0 | | 3.3 | 2.6 |
| | 0.5 | | 2.3 | 2.6 |
| 5-(1-Phenyl-n-butyl)pyrimidine | 1.0 | 2.6 | 4.0 | 1.0 |
| 5-(α-Chlorodiphenyl-methyl)pyrimidine | 2.0 | 1.3 | 3.3 | 3.3 |
| | 1.0 | 0.6 | 3.3 | 2.6 |
| | 0.5 | 0.6 | 2.6 | 1.3 |
| α,α-Bis(2-chlorophenyl)-5-pyrimidinemethanol | 1.0 | 4.0 | 4.0 | 4.0 |
| | 0.5 | 4.0 | 4.0 | 4.0 |
| | 0.1 | 2.6 | 3.3 | 4.0 |
| | 0.05 | 2.6 | 2.6 | 3.3 |
| | 0.01 | 0 | 0.6 | 1.6 |
| α,α-Bis(cyclopropyl)-5-pyrimidinemethanol | 1.0 | 2.6 | 2.3 | 2.3 |
| | 0.5 | 1.0 | 1.3 | 1.3 |
| | 0.1 | 0.3 | 0 | 0 |
| α-(4-Fluorophenyl)-α-phenyl-5-pyrimidinemethanol | 1.0 | | 3.6 | |
| | 0.5 | | 3.3 | |
| α-Phenyl-α-(2-thienyl)-5-pyrimidinemethanol | 1.0 | 1.3 | 2.3 | |
| 5-(α-Phenylphenethyl)pyrimidine | 1.0 | 3.3 | 3.0 | |
| | 0.5 | 2.6 | 2.6 | |
| | 0.25 | 1.3 | 1.3 | |

EXAMPLE 7

A field trial was run to determine the efficacy of a number of the pyrimidine compounds against *Venturia*

The fungicidal compounds were formulated as emulsifiable concentrates, suitable quantities measured out and diluted with water, and applied at the rates indicated in Chart 7 which follows.

Apple trees of the Rome Beauty variety were utilized. The trees had been planted 2½ feet apart in rows and grown as a hedge. Ten linear feet of hedgerow were used per replicate. Two replicates were used per treatment. Each treatment utilized 2 liters of the fungicidal composition. The treatment was applied using a $CO_2$ compression sprayer with a handheld boom equipped with a nozzle which delivered a half gallon per minute. Applications were made April 19, 24; May 2, 10, 17, 24; June 1, 16, 27.

Ten linear feet of row were evaluated per replicate for the incidence of foliar lesions caused by *Venturia inaequalis*. The Barratt-Horsfall rating system was used to determine disease incidence, and the values of incidence in turn used to determine the percent control. Observations were made on June 7 and 19, and on July 11.

Results of the treatments are shown in Chart 7. Column 1 gives the name of the compound; Column 2, the Type Formulation; Column 3, the Application Rate in parts per million; and Columns 4, 5, and 6, the Percent Control of foliar scab of apples on the dates evaluated.

Roses of the Crimson Glory variety were used in this experiment. Rosebushes were planted 1½ feet apart in rows. Each treatment was replicated 3 times. Six linear feet of row was used per replicate. An untreated buffer of 2 linear feet occurred between treatments.

All treatments were measured and thoroughly mixed with water. Each treatment was applied at a pressure of 50 p.s.i. until runoff using a $CO_2$ compression sprayer with handheld boom and five nozzles. Applications were made every 7 or 14 days. The 7-day spray schedule was applied on June 19, 27, and July 5. The 14-day spray schedule was applied on June 19 and July 5. The observation date was July 11. The Barratt-Horsfall rating system was used in the same manner as described in Example 7.

A control application consisted only of an insecticide. In addition, a commercially-available fungicide, methyl 1-(butylcarbamoyl)-2-benzimidazolecarbamate, formulated as a 50 percent wettable powder, was applied for comparison, being applied on June 19 and July 5.

Each treatment was evaluated for the percent control of rose powdery mildew and the results appear in Chart 8 which follows. Column 1 lists the compound used;

CHART 7

| Compound | Type Formulation | Appln. Rate ppm. | Percent Control of Foliar Scab Date Evaluated | | |
|---|---|---|---|---|---|
| | | | 6/7 | 6/19 | 7/11 |
| Control | EC Blank | 40 | 0(13)[1] | 0(25) | 0(63) |
| α,α-Diphenyl-5-pyrimidinemethanol | 0.72% EC | 40 | 71 | 77 | 51 |
| | | 80 | 87 | 90 | 74 |
| α-(2,4-Difluoro-phenyl)-α-phenyl-5-pyrimidinemethanol | 7.2% EC | 20 | 87 | 90 | 94 |
| | | 40 | 100 | 100 | 99 |
| α-(2,5-Dichloro-phenyl)-α-phenyl-5-pyrimidinemethanol | 0.72% EC | 20 | 71 | 87 | 81 |
| | | 40 | 100 | 97 | 95 |
| α-Cyclohexyl-α-phenyl-5-pyrimidine-methanol | 0.72% EC | 40 | 79 | 88 | 85 |
| | | 80 | 100 | 100 | 95 |
| α-(2-Chlorophenyl)-α-cyclohexyl-5-pyrimidinemethanol | 7.1% EC | 40 | 87 | 85 | 83 |
| | | 80 | 98 | 100 | 95 |
| α-(2,4-Dichloro-phenyl)-α-phenyl-5-pyrimidinemethanol | 7.2% EC | 20 | 90 | 87 | 85 |
| | | 40 | 100 | 96 | 98 |

[1]Disease incidence in the control trees.

EXAMPLE 8

In a further field trial, the efficacy of a number of pyrimidine compounds for controlling *Sphaerotheca pannosa* var. *rosae*, the causative organism of powdery mildew of roses was examined. The compounds were formulated as emulsifiable concentrates.

Column 2, the Type Formulation; Column 3, the Rate of Application; Column 4, the Interval in Days between treatments; and Column 5, the Percent Control of rose powdery mildew observed on the date evaluated.

CHART 8

| Compound | Type Formulation | Appln. Rate ppm. | Interval Days | Percent Control |
|---|---|---|---|---|
| Control, Insecticide only | | | | 0(53)[1] |
| α-(2,4-Difluorophenyl)-α-phenyl-5-pyrimidinemethanol | 7.2% EC | 20 | 7 | 97 |
| | | 40 | 7 | 99 |
| | | 80 | 7 | 99 |
| | | 40 | 14 | 93 |
| α-(2,5-Dichlorophenyl)-α-phenyl-5-pyrimidinemethanol | 0.72% EC | 20 | 7 | 98 |
| | | 40 | 7 | 99 |
| | | 80 | 7 | 97 |
| | | 40 | 14 | 100 |
| α-(2,4-Dichlorophenyl)-α-phenyl-5-pyrimidinemethanol | 7.2% EC | 40 | 7 | 96 |
| | | 40 | 14 | 98 |
| Methyl 1-(butylcarbamoyl)-2-benzimidazolecarbamate | 50W | 300 | 14 | 49 |

[1]Disease incidence in the control.

EXAMPLE 9

In another field trial, the efficacy of two of the pyrimidinemethanol compounds for controlling *Erysiphe graminis* f. *hordeii*, the causative organism of powdery mildew of barley, and for controlling *Erysiphe cichoracearum*, the causative organism of powdery mildew of squash, was examined when the compounds were applied to barley and squash seed as a spray or dust treatment.

The formulations of the two compounds tested were prepared as follows:

An 80 percent wettable powder formulation was prepared from 80 parts of α-(2-chlorophenyl)-α-(4-fluorophenyl)-5-pyrimidinemethanol, 5 parts of sodium lauryl sulfate, 5 parts of sodium lignosulfonate, and 10 parts of hydrated sodium silico aluminate.

Similarly, an 80 percent wettable powder formulation was prepared from 80 parts of α,α-diphenyl-5-pyrimidinemethanol, 3 parts of sodium lauryl sulfate, 3 parts of sodium lignosulfonate, 8 parts of hydrated sodium silico aluminate, and 6 parts finely-pulverized kaolin.

A spray solution for treating the seed was prepared in the following manner. A quantity of an 80 percent wettable powder formulation of the particular compound sufficient to give the desired amount of active ingredient was dispersed in a volume of water that would uniformly wet the seed being treated. The seed was placed in a tumbling machine and sprayed with the above-described solution while being tumbled. When application of the spray solution containing the active ingredient was complete, the seed was removed and air-dried by being spread out on a screen.

In the case where the seed was treated with a dust formulation of the active ingredient, a quantity of an 80 percent wettable powder formulation of the particular compound sufficient to give the desired amount of active ingredient was applied dry to the seed by shaking in a bag.

The seeds were planted by hand. The barley (Larker variety) was seeded in rows 30 feet long at the rate of approximately 120 lb. per acre. Included in the test plot was a row planted to untreated barley seed. The squash seeds were planted 4 inches apart in rows 30 feet long. Here, too, was a row planted to untreated squash seed. Early summer Crookneck variety of squash was used.

After seeding, general agricultural practices as to fertilization, weeding, and watering were followed.

Each treatment was evaluated for the fungicidal efficacy of the pyrimidine compounds. The barley was evaluated 41 days after seeding and the squash 69 days after seeding. The percent control determined by use of the Barratt-Horsfall Rating Scale is given in Chart 9. In Chart 9, Column 1 gives the names of the test compounds; Column 2, the Dosage in grams of active ingredient (a.i.) per kilogram of seed; Columns 3 and 4, the Percent Control of powdery mildew on barley when the barley seed is treated with a spray or with a dust, respectively, containing the fungicidal pyrimidine; and Columns 5 and 6, the Percent Control of powdery mildew on squash when the squash seed is treated with a spray, or with a dust, respectively, containing the fungicidal pyrimidine.

CHART 9

| Compound | Dosage g.(a.i.)/kg. | Percent Control of Powdery Mildew On | | | |
|---|---|---|---|---|---|
| | | Barley | | Squash | |
| | | Spray | Dust | Spray | Dust |
| α,α-Diphenyl-5-pyrimidinemethanol | 1 | NT[1] | NT | 0 | 0 |
| | 2 | 14 | 0 | 0 | 0 |
| | 4 | 40 | 0 | 14 | 0 |
| | 8 | 0 | 14 | 0 | 45 |
| α-(2-Chlorophenyl)-α-(4-fluorophenyl)-5-pyrimidinemethanol | 1 | 60 | 60 | 34 | 61 |
| | 2 | 82 | NT | 96 | NT |
| | 4 | 95 | 95 | 98 | 93 |
| | 8 | NT | NT | NT | NT |

[1]NT = Not Treated.
[2]The untreated barley control had 63 percent powdery mildew on the foliage.
[3]The untreated squash control had 44 percent powdery mildew on the foliage.

The results appearing in Chart 9 show that α-(2-chlorophenyl)-α-(4-fluorophenyl)-5-pyrimidinemethanol provided excellent control of powdery mildew of barley and squash at treatment rates of 4 grams per kilogram of seed, when applied to the seed either as a spray or a dust.

We claim:

1. A method of controlling phytopathogenic fungi of plants which comprises contacting the fungi with a fungicidally-effective but non-phytotoxic amount of one or more compounds of the formula

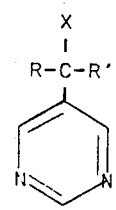

wherein
X is
  hydrogen,
  hydroxy,
  $C_1$–$C_4$ alkanoyloxy,
  N(R'')$_2$,
  $C_1$–$C_3$ alkyl,
  $C_1$–$C_3$ alkoxy,
  $C_1$–$C_3$ alkylthio,
  halo,
  cyano,
  anilino,
  hydroxylamino, imidazolylthio,
furylthio, or
thienylthio;

R is
 C$_1$–C$_{13}$ alkyl,
 C$_2$–C$_{12}$ alkenyl,

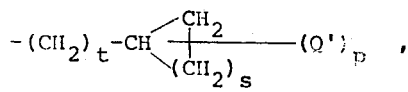

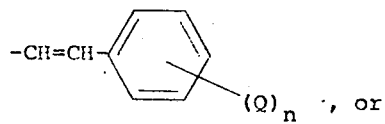, or

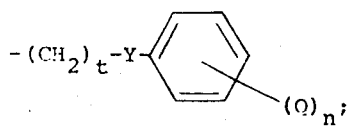;

R' is
 C$_2$–C$_{13}$ alkyl,
 C$_2$–C$_{12}$ alkenyl,
 norbornen-2-yl,
 2-norbornyl,
 adamantyl,

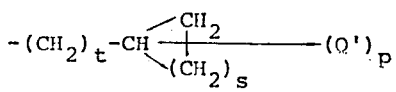,

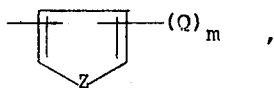,

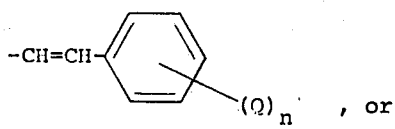, or

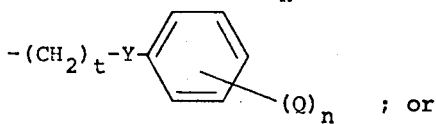; or when X is hydrogen or hydroxy, R and R' taken together with the carbon atom to which they are attached form a ring of the formula

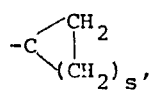,

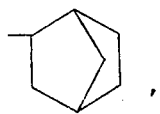,

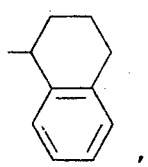,

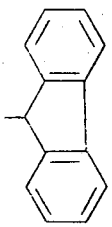, or

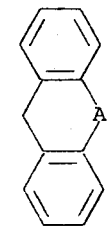;

Q is C$_1$–C$_4$ alkyl, C$_1$–C$_4$ alkoxy, C$_1$–C$_4$ alkylthio, halo, hydroxy, trifluoromethyl, C$_1$–C$_4$ alkylsulfonyl, nitro, or di(C$_1$–C$_4$ alkyl)amino, or two Q's attached to adjacent carbon atoms of a benzene ring form a methylenedioxy group;
Q' is C$_1$–C$_4$ alkyl or methoxy;
Y is oxygen, sulfur, or a carbon-to-carbon bond;
Z is oxygen or sulfur;
A is oxygen, sulfur, CH$_2$, CH$_2$—CH$_2$, or CH=CH;
R'' is hydrogen, C$_1$–C$_4$ alkyl, or C$_1$–C$_4$ alkanoyl;
$n$ is 0 to 5;
$m$ is 0 to 2;
$p$ is 0 to 3;
$s$ is 1 to 6; and
$t$ is 0 to 5,
or the nonphytotoxic acid addition salts thereof.

2. The method of claim 1 wherein said compound is applied in combination with an inert diluent and a wetting agent.

3. The method of claim 1 wherein X of said compound is hydrogen or hydroxy.

4. The method of claim 1 wherein the compound is α-(2,4-dichlorophenyl)-α-phenyl-5-pyrimidinemethanol.

5. The method of claim 1 wherein the compound is α-(2-chlorophenyl)-α-(3-chlorophenyl)-5-pyrimidinemethanol.

6. The method of claim 1 wherein the compound is α-(2-chlorophenyl)-α-cyclohexyl-5-pyrimidinemethanol.

7. The method of claim 1 wherein the compound is α-(2,4-difluorophenyl)-α-phenyl-5-pyrimidinemethanol.

8. The method of claim 1 wherein the compound is α,α-bis(2-chlorophenyl)-5-pyrimidinemethanol.

9. The method of claim 1 wherein the compound is α-(2,5-dichlorophenyl)-α-phenyl-5-pyrimidinemethanol.

10. The method of claim 1 wherein the compound is α-(2-chlorophenyl)-α-(4-fluorophenyl)-5-pyrimidinemethanol.

11. The method of claim 1 wherein the compound is α-(2-chlorophenyl)-α-phenyl-5-pyrimidinemethanol.

12. The method of claim 1 wherein the compound is α-(2-chlorophenyl)-α-(4-chlorophenyl)-5-pyrimidinemethanol.

* * * * *

UNITED STATES PATENT OFFICE
CERTIFICATE OF CORRECTION

PATENT NO. : 3,887,708
DATED : June 3, 1975
INVENTOR(S) : Harold M. Taylor et al.

It is certified that error appears in the above-identified patent and that said Letters Patent are hereby corrected as shown below:

Column 4, line 4, "4ethylhexyl" should read ---4-ethylhexyl---.

Column 4, line 51, "P-toluenesulfonic" should read ---p-toluenesulfonic---.

Column 5, line 41, "5-[α(4-Bromophenylthio)" should read ---5-[α-(4-Bromophenylthio)---.

Column 5, line 43, "5-[α-n-Propylthio)diphenylmethyl]pyrimidine" should read ---5-[α-(n-Propylthio)diphenylmethyl]pyrimidine---.

Column 5, line 46, "p-dimethoxybenxyl" should read ---p-dimethoxybenzyl---.

Column 6, line 47, "throughly" should read ---thoroughly---.

Column 8, line 57, "gell" should read ---gel---.

Column 24, line 39, should read ---

| Compound | Application Rate, ppm. | Control Rating |
|---|---|---|
| α-Cyclopentyl-α-cyclopentylmethyl-5-pyrimidinemethanol | 40 | 5 |
|  | 20 | 5 |
|  | 10 | 5 |
|  | 5 | 2 ----. |

Signed and Sealed this twenty-sixth Day of August 1975

[SEAL]

Attest:

RUTH C. MASON
Attesting Officer

C. MARSHALL DANN
Commissioner of Patents and Trademarks